(12) United States Patent
He et al.

(10) Patent No.: US 12,015,560 B2
(45) Date of Patent: Jun. 18, 2024

(54) DATA TRANSMISSION METHOD AND NETWORK DEVICE

(71) Applicant: Huawei Technologies Co., Ltd., Shenzhen (CN)

(72) Inventors: Zijian He, Beijing (CN); Hui Lu, Shenzhen (CN); Linchun Wang, Beijing (CN); Xingtao Yan, Beijing (CN); Yang Liu, Beijing (CN); Wenzong Yang, Shenzhen (CN); Jingzhou Yu, Beijing (CN); Xiang Yu, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 378 days.

(21) Appl. No.: 17/369,739

(22) Filed: Jul. 7, 2021

(65) Prior Publication Data
US 2021/0336895 A1   Oct. 28, 2021

Related U.S. Application Data

(63) Continuation of application No. PCT/CN2019/130692, filed on Dec. 31, 2019.

(30) Foreign Application Priority Data

Jan. 7, 2019   (CN) .......................... 201910013069.0

(51) Int. Cl.
*H04L 47/10* (2022.01)
*H04L 47/34* (2022.01)
*H04W 72/23* (2023.01)

(52) U.S. Cl.
CPC .............. *H04L 47/39* (2013.01); *H04L 47/34* (2013.01); *H04W 72/23* (2023.01)

(58) Field of Classification Search
CPC ....... H04L 47/39; H04L 47/34; H04L 5/0044; H04L 47/125; H04L 47/26; H04L 47/27; H04L 47/30; H04L 5/0053; H04W 72/23
See application file for complete search history.

(56) References Cited

U.S. PATENT DOCUMENTS 7,668,104 B1 *   2/2010   Pannell ................... H04L 47/26
                                                          370/235
9,755,983 B1 *   9/2017   Swartzentruber ....... H04L 47/39
(Continued)

FOREIGN PATENT DOCUMENTS

CN         101795236 A      8/2010
CN         103441945 A      12/2013
(Continued)

*Primary Examiner* — Sudesh M Patidar
(74) *Attorney, Agent, or Firm* — Leydig, Voit & Mayer, Ltd.

(57) ABSTRACT

This application provides for data transmission between first and second network devices. The first network device requests information from the second network device and in return receives grant information from the second network device. The grant information includes at least a first sequence number that is used by the first network device to determine a first credit limit, where the first credit limit is an amount of data allowed to be sent by the first network device in a packet-distributed load sharing manner. The first network device sends data to the second network device based on the first credit limit. Second and third sequence numbers are also described.

20 Claims, 13 Drawing Sheets

(56) References Cited

U.S. PATENT DOCUMENTS

| | | | |
|---|---|---|---|
| 2002/0055993 A1* | 5/2002 | Shah | H04L 47/10 |
| | | | 709/200 |
| 2007/0094530 A1* | 4/2007 | Kakizaki | H04L 47/10 |
| | | | 714/4.4 |
| 2007/0121706 A1* | 5/2007 | Nakamura | H04J 13/00 |
| | | | 375/147 |
| 2012/0027027 A1* | 2/2012 | Yamaura | H04L 1/1832 |
| | | | 370/465 |
| 2013/0088959 A1* | 4/2013 | Kamath | H04L 47/39 |
| | | | 370/235 |
| 2015/0007189 A1* | 1/2015 | De Gruijl | H04L 47/39 |
| | | | 718/104 |
| 2015/0178241 A1* | 6/2015 | Ajanovic | G06F 13/124 |
| | | | 710/29 |
| 2016/0286452 A1 | 9/2016 | Tian | |
| 2017/0079041 A1* | 3/2017 | Raustia | H04L 5/06 |
| 2017/0149678 A1* | 5/2017 | Dumitrescu | H04L 47/527 |
| 2018/0278550 A1 | 9/2018 | Rosen et al. | |
| 2019/0044872 A1* | 2/2019 | Ganapathi | H04L 47/32 |

FOREIGN PATENT DOCUMENTS

| | | | |
|---|---|---|---|
| CN | 103905300 A | | 7/2014 |
| CN | WO2017167098 | * | 5/2017 |
| CN | 108337160 A | | 7/2018 |
| CN | 108512771 A | | 9/2018 |
| JP | H1155314 | * | 2/1999 |
| WO | 2011120467 A2 | | 10/2011 |

* cited by examiner

DATA TRANSMISSION METHOD AND NETWORK DEVICE

CROSS-REFERENCE TO RELATED APPLICATIONS

This application is a continuation of International Application No. PCT/CN2019/130692, filed on Dec. 31, 2019, which claims priority to Chinese Patent Application No. 201910013069.0, filed on Jan. 7, 2019. The disclosures of the aforementioned applications are hereby incorporated by reference in their entireties.

TECHNICAL FIELD

Embodiments of this application relate to the communications field, and more specifically, to a data transmission method and a network device.

BACKGROUND

A data center network (DCN) uses a Clos topology structure in most cases, typically, a three-layer fat-tree structure or a leaf-spine structure. With development of services, the data center network faces new demands. Cloud-based reconstruction of a central office (CO) of an operator, high-performance computing, machine learning, remote direct memory access over converged Ethernet (ROCE), and the like all require a high-performance data center network.

In a packet-switched load sharing manner, path selection is performed once for each data packet in a data flow, and absolute load balancing can be implemented. However, because delays, congestion degrees, and the like vary with paths, data packets are out of order at a receive-end network device. Usually, an out-of-order problem can be resolved through brute-force reordering. To be specific, a large cache is disposed at the receive-end network device to receive the out-of-order data packets and perform reordering.

However, the reordering operation is implemented by a chip, and usually, resources in the chip are very limited. Therefore, it is impossible that a large amount of storage resources are used for caching and ordering. When caching resources are insufficient, the ordering cache is easily filled up. As a result, it cannot be ensured that all received data is reordered, resulting in out-of-order sending of the data packets from the receive-end network device.

SUMMARY

This application provides a data transmission method and a network device, so as to avoid out-of-order sending of data packets from a receive-end network device and improve performance of a data center network.

According to a first aspect, this application provides a data transmission method. The method includes: sending, by a first network device, request information to a second network device, where the request information is used to request to send data; receiving, by the first network device, grant information sent by the second network device, where the grant information includes a first sequence number; determining, by the first network device, a first credit limit based on the first sequence number, where the first credit limit is an amount of data that is allowed to be sent by the first network device in a packet-distributed load sharing manner; and sending, by the first network device, data to the second network device based on the first credit limit.

In the foregoing technical solution, the first network device determines, based on the grant information sent by the second network device, the amount of data that is allowed to be sent in the packet-distributed load sharing manner, and further sends data to the second network device based on the amount of data. This can avoid that an amount of data sent exceeds an amount of data that can be cached and ordered by the second network device, thereby avoiding out-of-order sending of data packets from the second network device and improving performance of a data center network.

In some possible implementations, the determining, by the first network device, a first credit limit based on the first sequence number includes: when the first sequence number is greater than a largest first sequence number already received by the first network device, determining, by the first network device, the first credit limit based on a difference between the first sequence number and the largest first sequence number.

Considering that grant information may be lost during transmission, in the foregoing technical solution, the first network device determines the first credit limit based on the difference between the recorded largest first sequence number and the first sequence number received this time. In this way, even if grant information is lost, a first credit limit determined by the first network device based on subsequently received grant information also includes a credit limit indicated in the lost grant information, thereby improving reliability of data transmission of a data center network.

In some possible implementations, the sending, by the first network device, data to the second network device based on the first credit limit includes: within a preset time period, when the first credit limit is less than or equal to a first threshold, switching, by the first network device, from the packet-distributed load sharing manner to a per-flow load sharing manner, and sending data to the second network device in the per-flow load sharing manner.

In the foregoing technical solution, when the first credit limit is comparatively small within a period of time, the first network device sends data in the per-flow load sharing manner. This can avoid out-of-order data packets.

In some possible implementations, the grant information further includes a second sequence number, and the method further includes: determining, by the first network device, a second credit limit based on the second sequence number, where the second credit limit is an amount of data that is allowed to be sent by the first network device to a port of the second network device; and the sending, by the first network device, data to the second network device based on the first credit limit includes: sending, by the first network device, data to the second network device based on the first credit limit and the second credit limit.

In the foregoing technical solution, the first network device determines, based on both the first credit limit and the second credit limit, a data sending manner and a size of data to be sent. This can ensure that neither congestion nor out-of-order occurs during transmission of data packets, thereby improving performance of a data center network.

In some possible implementations, the determining, by the first network device, a second credit limit based on the second sequence number includes: when the second sequence number is greater than a largest second sequence number already received by the first network device, determining, by the first network device, the second credit limit based on a difference between the second sequence number and the largest second sequence number.

Considering that grant information may be lost during transmission, in the foregoing technical solution, the first network device determines the second credit limit based on the difference between the recorded largest second sequence number and the second sequence number received this time. In this way, even if grant information is lost, a second credit limit determined by the first network device based on subsequently received grant information also includes a credit limit indicated in the lost grant information, thereby improving reliability of data transmission of a data center network.

In some possible implementations, the sending, by the first network device, data to the second network device based on the first credit limit and the second credit limit includes: sending, by the first network device, data to the second network device based on a smaller one between the first credit limit and the second credit limit; or when the first credit limit is less than the second credit limit, and a difference between the first credit limit and the second credit limit is greater than a second threshold, switching, by the first network device, from the packet-distributed load sharing manner to a per-flow load sharing manner, and sending data to the second network device in the per-flow load sharing manner.

In the foregoing technical solution, the first network device determines, based on both the first credit limit and the second credit limit, a data sending manner and a size of data to be sent. In this way, data packets can be transmitted more efficiently, thereby improving performance of a data center network.

In some possible implementations, after the first network device receives the grant information sent by the second network device, the method further includes: when the first sequence number is greater than the largest first sequence number, updating, by the first network device, the largest first sequence number to the first sequence number; and when the second sequence number is greater than the largest second sequence number, updating, by the first network device, the largest second sequence number to the second sequence number.

In the foregoing technical solution, the first network device updates the largest first sequence number and the largest second sequence number in real time, thereby ensuring that the first credit limit is neither excessive nor insufficient.

In some possible implementations, the request information further includes an enabling field, where the enabling field is used to indicate whether a packet distribution function and/or a request-grant flow control function are/is enabled on the first network device.

In the foregoing technical solution, the first network device notifies the second network device of a used load sharing manner by using the request information, so that the second network device can correctly receive data.

In some possible implementations, the request information is further used to indicate a requested amount, where the requested amount is an amount of data that the first network device requests to send.

In the foregoing technical solution, the first network device sends, to the second network device, the amount of data requested to be sent, so that the second network device can allocate resources more properly.

In some possible implementations, before a cumulative base of the first network device is synchronized with a cumulative base of the second network device, the request information includes the requested amount; and after the first network device receives the grant information, the method further includes: determining, by the first network device, the cumulative base based on the first sequence number or the second sequence number, where the cumulative base is used to determine a third sequence number, and the third sequence number is a sum of the cumulative base, an amount of data that the first network device has requested to send, and an amount requested this time. By using the foregoing technical solution, reliability of data transmission can be improved.

In some possible implementations, after a cumulative base of the first network device is synchronized with a cumulative base of the second network device, the request information includes a third sequence number, where the third sequence number is a sum of the cumulative base, an amount of data that the first network device has requested to send, and an amount requested this time.

Considering that request information may be lost during transmission, in the foregoing technical solution, after the cumulative base of the first network device is synchronized with the cumulative base of the second network device, the sum of the cumulative base, the amount of data that the first network device has requested to send, and the amount requested this time is used to indicate an amount of data that the first network device requests to send. In this way, even if request information is lost, a requested amount determined by the second network device based on subsequently received request information also includes a data amount indicated in the lost request information, thereby improving reliability of data transmission of a data center network.

In some possible implementations, standard virtual extensible local area network generic protocol extension encapsulation or standard generic network virtualization encapsulation is used for a packet carrying the request information and a packet carrying the grant information.

In the foregoing technical solution, the packets are encapsulated in a standard encapsulation form. This can avoid difficulty in interaction between devices of different vendors.

According to a second aspect, this application provides a data transmission method. The method includes: receiving, by a second network device, request information sent by a first network device, where the request information is used to request to send data; determining, by the second network device, a first credit limit, where the first credit limit is an amount of data that is allowed to be sent by the first network device in a packet-distributed load sharing manner; determining, by the second network device, a first sequence number based on the first credit limit, where the first sequence number is used to indicate a sum of an amount of data that the second network device has authorized the first network device to send in the packet-distributed load sharing manner and an amount of data that the second network device authorizes the first network device to send in the packet-distributed load sharing manner this time; and sending, by the second network device, grant information to the first network device, where the grant information includes the first sequence number.

In the foregoing technical solution, the second network device determines an amount of data that is allowed to be sent by the first network device in the packet-distributed load sharing manner, and feeds back the amount to the first network device, so that the first network device may send data to the second network device based on the amount of data. This can avoid that an amount of data sent exceeds an amount of data that can be cached and ordered by the second network device, thereby avoiding out-of-order sending of data packets from the second network device and improving performance of a data center network.

In some possible implementations, the determining, by the second network device, a first credit limit includes: determining, by the second network device, that the first credit limit is a first preset limit; or determining, by the second network device, the first credit limit based on a remaining space in an ordering cache and the request information, where the ordering cache is configured to reorder out-of-order data.

In the foregoing technical solution, the second network device determines, based on the remaining space in the ordering cache, an amount of data that is allowed to be sent by the first network device in the packet-distributed load sharing manner. This can avoid that an amount of data sent exceeds an amount of data that can be cached and ordered by the second network device, thereby avoiding out-of-order sending of data packets from the second network device and improving performance of a data center network.

In some possible implementations, the grant information further includes a second sequence number, where the second sequence number is used to indicate a sum of an amount of data that the second network device has authorized the first network device to send to a port of the second network device and an amount of data that the second network device authorizes the first network device to send to a port of the second network device this time; and the method further includes: determining, by the second network device, a second credit limit, where the second credit limit is an amount of data that is allowed to be sent by the first network device to a port of the second network device; and determining, by the second network device, the second sequence number based on the second credit limit.

In the foregoing technical solution, the second network device determines an amount of data that is allowed to be sent by the first network device to a port of the second network device, and feeds back the amount to the first network device, so that the first network device may send data to the second network device based on the amount of data. This can avoid that an amount of data sent exceeds an amount of data that can be received by the second network device, thereby avoiding traffic congestion and improving performance of a data center network.

In some possible implementations, the determining, by the second network device, a second credit limit includes: determining, by the second network device, that the second credit limit is a second preset limit; or determining, by the second network device, the second credit limit based on a bandwidth margin and the request information. By using the foregoing technical solution, it can be avoided that an amount of data sent exceeds an amount of data that can be received by the second network device, thereby avoiding traffic congestion and improving performance of a data center network.

In some possible implementations, the request information further includes an enabling field, where the enabling field is used to indicate whether a packet switching function and/or a request-grant flow control function are/is enabled on the first network device.

In the foregoing technical solution, the first network device notifies the second network device of a used load sharing manner by using the request information, so that the second network device can correctly receive data.

In some possible implementations, the request information is further used to indicate a requested amount, where the requested amount is an amount of data that the first network device requests to send; the determining, by the second network device, the first credit limit based on a remaining space in an ordering cache and the request information includes: determining, by the second network device, the first credit limit based on the remaining space in the ordering cache and the requested amount; and the determining, by the second network device, the second credit limit based on a bandwidth margin and the request information includes: determining, by the second network device, the second credit limit based on the bandwidth margin and the requested amount.

In the foregoing technical solution, the first network device sends, to the second network device, the amount of data requested to be sent, so that the second network device can allocate resources more properly.

In some possible implementations, before a cumulative base of the first network device is synchronized with a cumulative base of the second network device, the request information includes the requested amount; the method further includes: generating, by the second network device, the cumulative base; the determining, by the second network device, a first sequence number based on the first credit limit includes: determining, by the second network device, the first sequence number based on the cumulative base and the first credit limit; and the determining, by the second network device, the second sequence number based on the second credit limit includes: determining, by the second network device, the second sequence number based on the cumulative base and the second credit limit. By using the foregoing technical solution, reliability of data transmission can be improved.

In some possible implementations, after a cumulative base of the first network device is synchronized with a cumulative base of the second network device, the request information includes a third sequence number, where the third sequence number is a sum of the cumulative base, an amount of data that the first network device has requested to send, and an amount requested this time.

Considering that request information may be lost during transmission, in the foregoing technical solution, after the cumulative base of the first network device is synchronized with the cumulative base of the second network device, the sum of the cumulative base, the amount of data that the first network device has requested to send, and the amount requested this time is used to indicate an amount of data that the first network device requests to send. In this way, even if request information is lost, a requested amount determined by the second network device based on subsequently received request information also includes a data amount indicated in the lost request information, thereby improving reliability of data transmission of a data center network.

In some possible implementations, standard virtual extensible local area network generic protocol extension encapsulation or standard generic network virtualization encapsulation is used for a packet carrying the request information and a packet carrying the grant information.

In the foregoing technical solution, the packets are encapsulated in a standard encapsulation form. This can avoid difficulty in interaction between devices of different vendors.

According to a third aspect, this application provides a network device, including a module configured to implement the first aspect or any implementation of the first aspect.

According to a fourth aspect, this application provides a network device, including a module configured to implement the second aspect or any implementation of the second aspect.

According to a fifth aspect, this application provides a chip, including a transceiver, a processor, and a memory, and configured to perform the method according to any one of the first aspect or the implementations of the first aspect.

According to a sixth aspect, this application provides a chip, including a transceiver, a processor, and a memory, and configured to perform the method according to any one of the second aspect or the implementations of the second aspect.

According to a seventh aspect, this application provides a network device, including a transceiver, a processor, and a memory, and configured to perform the method according to any one of the first aspect or the implementations of the first aspect.

According to an eighth aspect, this application provides a network device, including a transceiver, a processor, and a memory, and configured to perform the method according to any one of the second aspect or the implementations of the second aspect.

According to a ninth aspect, this application provides a computer readable storage medium, including an instruction, and when the instruction runs on a network device, the network device is enabled to perform the method according to any one of the first aspect or the implementations of the first aspect.

According to a tenth aspect, this application provides a computer readable storage medium, including an instruction, and when the instruction runs on a network device, the network device is enabled to perform the method according to any one of the second aspect or the implementations of the second aspect.

According to an eleventh aspect, this application provides a computer program product, and when the computer program product runs on a network device, the network device is enabled to perform the method according to any one of the first aspect or the implementations of the first aspect.

According to a twelfth aspect, this application provides a computer program product, and when the computer program product runs on a network device, the network device is enabled to perform the method according to any one of the second aspect or the implementations of the second aspect.

DESCRIPTION OF EMBODIMENTS

The following describes technical solutions of this application with reference to the accompanying drawings.

The technical solutions in the embodiments of this application may be applied to data center networks of various topology structures, for example, a hierarchical Internet model (for example, a three-layer fat-tree structure). The technical solutions in the embodiments of this application may be alternatively applied to another scenario, provided that in the scenario, a source-end device needs to send data to a destination-end device, and the destination-end device needs to receive the data sent by the source-end device.

A type of a network device is not specifically limited in this application. For example, the network device may be a network device in a data center network, specifically, for example, various switches or another device with a function similar to a function of a switch.

It can be understood that "first" and "second" in a first network device and a second network device in the embodiments of this application are used merely for distinguishing between different network devices, instead of limiting functions of the network devices. A network device may be used as the first network device, or may be used as the second network device. Assuming that a network includes two switches: a switch A and a switch B, if the switch A sends data to the switch B, the switch A may be a first network device, and the switch B may be a second network device; or if the switch B sends data to the switch A, the switch A may be a second network device, and the switch B may be a first network device.

The embodiments of this application provide a data transmission method, so as to avoid out-of-order sending of data packets from a receive-end device and improve performance of a data center network.

Figure 1:
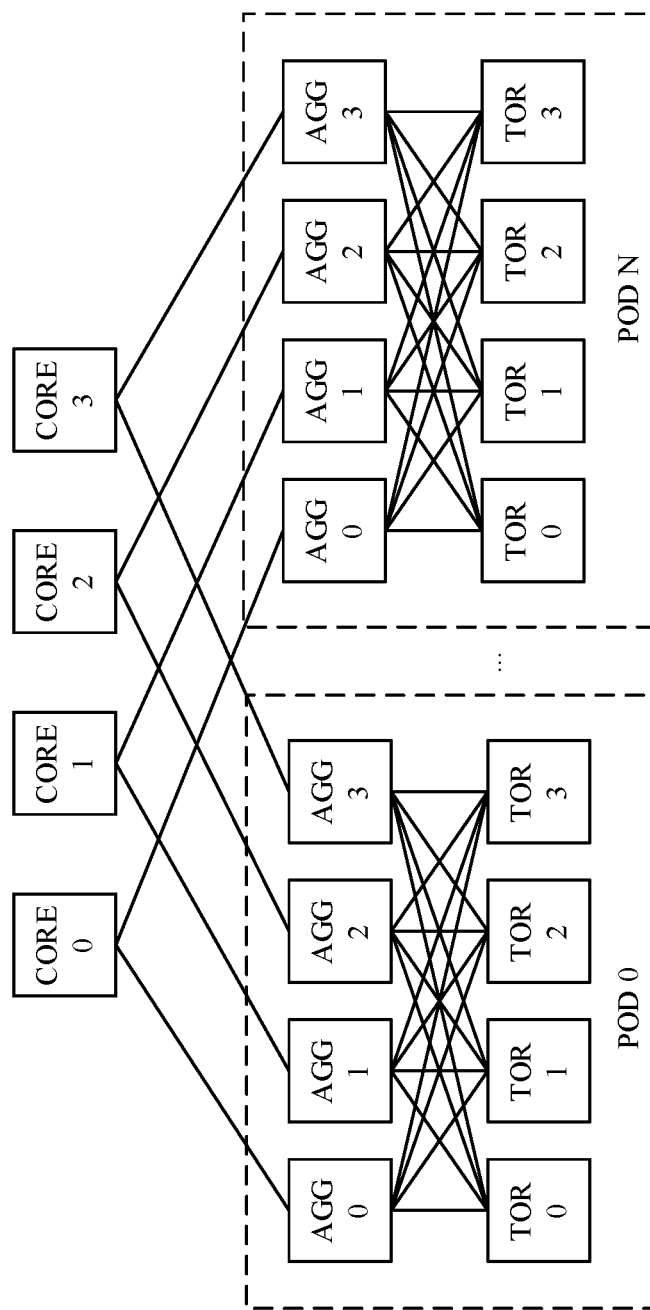
FIG. 1 is a schematic diagram of a topology structure of a data center network to which an embodiment of this application may be applied.

FIG. 1 is a schematic diagram of a topology structure of a data center network to which an embodiment of this application may be applied. As shown in FIG. 1, the data center network is divided into three layers: an access layer (top of rack, TOR or edge), an aggregation layer (AGG), and a core layer (CORE). A TOR network device is physically connected to a server. An AGG network device is connected to the TOR, and provides some other services, for example, network analysis. A CORE network device provides high-speed forwarding for traffic to and from a data center, and is connected to a plurality of aggregation layers AGG. A plurality of TOR network devices and a plurality of AGG network device may be alternatively classified into a point of deployment (POD). A data packet enters from the TOR and arrives at a corresponding destination after being forwarded by the TOR, the AGG, and the CORE. Each node at each layer in the data center network corresponds to one network device.

Figure 2:
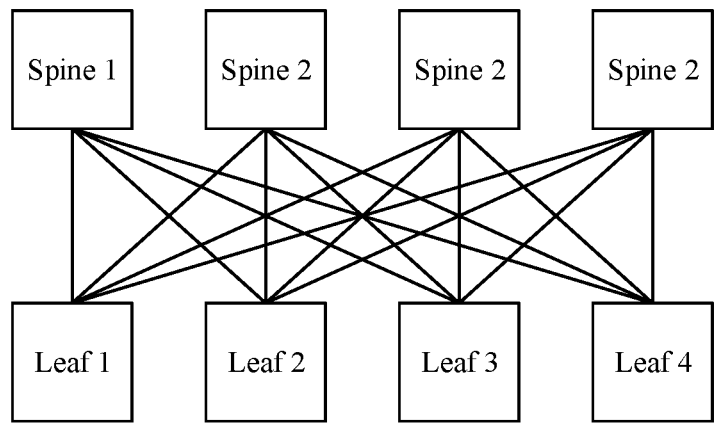
FIG. 2 is a schematic diagram of another topology structure of a data center network to which an embodiment of this application may be applied.

FIG. 2 is a schematic diagram of another topology structure of a data center network to which an embodiment of this application may be applied. The topology structure in FIG. 2 is a leaf-spine structure. As shown in FIG. 2, the leaf-spine structure includes two layers: a leaf layer and a spine layer. A quantity of uplinks of each leaf-layer network device is equal to a quantity of spine-layer network devices, and a quantity of downlinks of each spine-layer network device is equal to a quantity of leaf-layer network devices.

It should be understood that FIG. 1 and FIG. 2 are merely examples, and the embodiments of this application may be alternatively applied to another type of data center network.

The following uses the fat-tree topology structure as an example to describe the data transmission method in the embodiments of this application.

Figure 3:
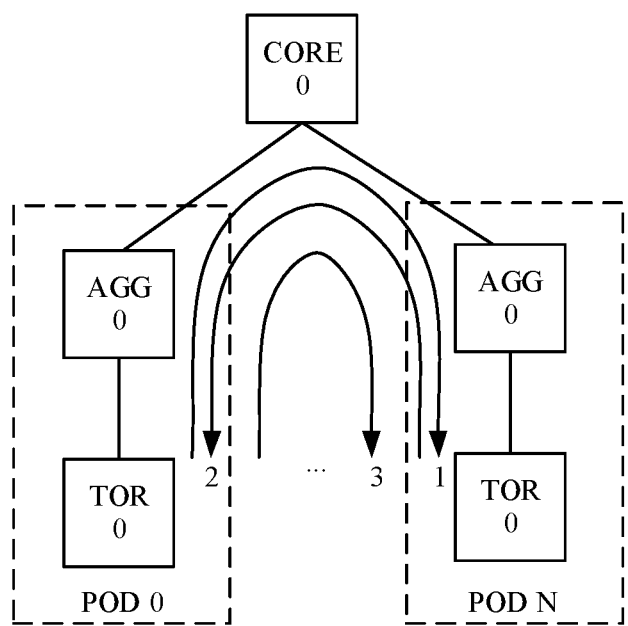
FIG. 3 shows information exchange in a data center network to which a data transmission method according to an embodiment of this application is applied.

FIG. 3 shows information exchange in a data center network to which a data transmission method according to an embodiment of this application is applied. It should be understood that FIG. 3 is merely an example, and the data center network in FIG. 3 may alternatively include more TORs, AGGs, and COREs, or include another network device.

Figure 4:
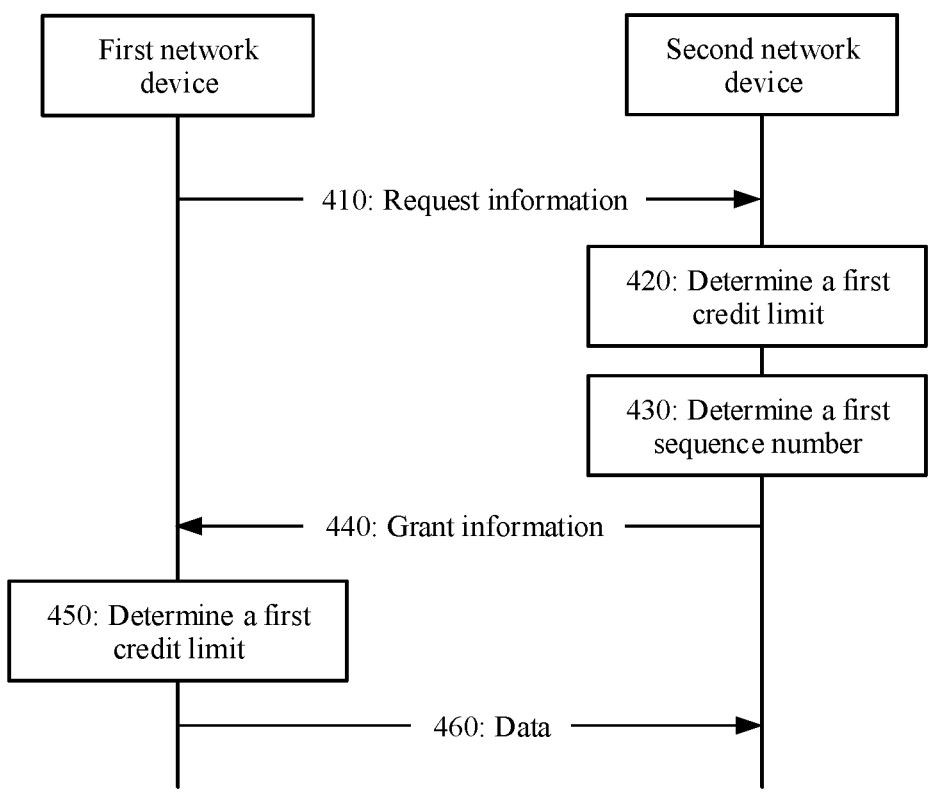
FIG. 4 is a schematic flowchart of a data transmission method according to an embodiment of this application.

FIG. 4 is a schematic flowchart of a data transmission method according to an embodiment of this application. The method shown in FIG. 4 may include at least a part of the following content.

In 410, a first network device sends request information to a second network device, where the request information is used to request to send data.

In 420, the second network device determines a first credit limit, where the first credit limit is an amount of data that is allowed to be sent by the first network device in a packet-distributed load sharing manner.

In 430, the second network device determines a first sequence number based on the first credit limit, where the first sequence number is used to indicate a sum of an amount of data that the second network device has authorized the first network device to send in the packet-distributed load sharing manner and an amount of data that the second network device authorizes the first network device to send in the packet-distributed load sharing manner this time.

In 440, the second network device sends grant information to the first network device, where the grant information includes the first sequence number.

In 450, the first network device determines the first credit limit based on the first sequence number.

In 460, the first network device sends data to the second network device based on the first credit limit.

The first network device in this embodiment of this application may be an ingress-side network device, or also referred to as a source-end network device. For example, the first network device may be a TOR network device or an AGG network device in a POD 0 in FIG. 1, or a leaf-layer network device in FIG. 2.

The second network device in this embodiment of this application may be an egress-side network device, or also referred to as a destination-end network device. For example, the second network device may be a TOR network device or an AGG network device other than the first network device in a POD 0 to a POD N in FIG. 1, or a leaf-layer network device other than the first network device in FIG. 2.

The request information in this embodiment of this application may be carried in a data packet (for example, a control field is added to the data packet), or may be sent to the second network device by using a dedicated message. The grant information may be sent to the first network device by using a dedicated message. Alternatively, the request information and the grant information may be sent in another manner that can implement sending of the request information and the grant information. This is not specifically limited in this embodiment of this application.

In the foregoing technical solution, the first network device determines, based on the grant information sent by the second network device, the amount of data that is allowed to be sent in the packet-distributed load sharing manner, and further sends data to the second network device based on the amount of data. This can avoid that an amount of data sent exceeds an amount of data that can be cached and ordered by the second network device, thereby avoiding out-of-order sending of data packets from the second network device and improving performance of a data center network.

After receiving the request information from the first network device, the second network device determines the first credit limit allocated to the first network device.

In some embodiments, the second network device may determine, based on a quantity of request information and a remaining space in an ordering cache in the second network device, the first credit limit allocated to the first network device, where the ordering cache is configured to reorder out-of-order data. For example, the second network device may count a quantity of simultaneously received request information, and allocate all or some of resources evenly to first network devices that send the request information. For another example, the second network device may count a quantity of request information received within a comparatively short period of time, and allocate, to first network devices that send the request information, all or some of resources evenly or based on different weights (for example, the weights are allocated based on data priorities or request information arrival time). For another example, the first network device and the second network device may agree on a preset credit limit. After receiving the request message, the second network device may directly allocate ordering and caching resources of the preset credit limit to the first network device. The preset credit limit may be set to a comparatively small value, so that the second network device can receive and reorder data sent by the first network device.

In some other embodiments, the request information sent by the first network device indicates a requested amount, where the requested amount is an amount of data that the first network device requests to send. In this way, the second network device may determine, based on a remaining space in an ordering cache and the requested amount, the first credit limit allocated to the first network device.

The second network device determines the first sequence number based on the first credit limit. The first sequence number is used to indicate a sum of an amount of data that the second network device has authorized the first network device to send in the packet-distributed load sharing manner and an amount of data that the second network device authorizes the first network device to send in the packet-distributed load sharing manner this time.

In some embodiments, when the first credit limit indicates that there is an available space in the ordering cache, the second network device generates one first sequence number, and sends the first sequence number to the first network device by using the grant information, until the first credit limit is all allocated. In this case, each first sequence number represents one unit credit limit. The unit credit limit may be configured. For example, the unit credit limit may be configured to 1 KB, 2 KB, 4 KB, 8 KB, or 16 KB.

In some other embodiments, when the first credit limit indicates that there is an available space in the ordering cache, the second network device generates one first sequence number, directly allocates all of the first credit limit, and sends the first sequence number to the first network device by using the grant information. In this case, the first sequence number represents at least one unit credit limit.

In some other embodiments, when the first credit limit indicates that there is an available space in the ordering cache, the second network device generates a plurality of first sequence numbers. When a cumulative credit limit represented by a last first sequence number reaches an allowed-to-be-sent threshold, the second network device sends the last first sequence number by using the grant information.

After receiving the grant information sent by the second network device, the first network device sends data to the second network device.

In some embodiments, the first network device determines the first credit limit based on the first sequence number in the grant information, and sends data to the second network device based on the first credit limit. To be specific, the first network device sends data to the second network device based on the amount of data that the second network device authorizes the first network device to send in the packet-distributed load sharing manner this time. Specifically, the first network device determines the first credit limit based on a difference between the first sequence number and a largest first sequence number already received by the first network device.

In some embodiments, when the first credit limit indicates that there is an available space in the ordering cache in the second network device, the first network device sends data with a size less than or equal to the first credit limit to the second network device in the packet-distributed load sharing manner.

In some other embodiments, within a preset time period, when the first credit limit is less than or equal to a first threshold, the first network device switches from the packet-distributed load sharing manner to a per-flow load sharing manner, and sends data to the second network device in the per-flow load sharing manner. To be specific, when the first credit limit indicates that the remaining space in the ordering cache in the second network device is zero or quite small, the first network device switches from the packet-distributed load sharing manner to the per-flow load sharing manner, and sends data to the second network device in the per-flow load sharing manner.

In some other embodiments, within a preset time period, if the first network device receives no grant information sent by the second network device, the first network device switches from the packet-distributed load sharing manner to a per-flow load sharing manner, and sends data to the second network device in the per-flow load sharing manner.

After receiving the grant information sent by the second network device, the first network device determines the first credit limit based on the first sequence number in the grant information, to obtain a cumulative value of the first credit limit. The first network device sends data to the second network device based on the obtained cumulative value of the first credit limit. Specifically, the first network device compares the first sequence number with the largest first sequence number already received by the first network device. When the first sequence number is greater than the largest first sequence number already received by the first network device, the first network device adds, to the cumulative value of the first credit limit, a data amount corresponding to the difference between the first sequence number and the largest first sequence number, to obtain a new cumulative value of the first credit limit, and updates the largest first sequence number to the first sequence number; or when the first sequence number is less than or equal to the largest first sequence number already received by the first network device, the first network device does not update the cumulative value of the first credit limit or the largest first sequence number.

The first network device sends data to the second network device based on the new cumulative value of the first credit limit.

It should be understood that because the first network device continuously transmits data after receiving the grant information, the cumulative value of the first credit limit also keeps changing. That the first network device sends data to the second network device based on the new cumulative value of the first credit limit may be that the first network device sends data to the second network device based on a current cumulative value of the first credit limit.

In some embodiments, when the new cumulative value of the first credit limit indicates that there is an available space in the ordering cache in the second network device, the first network device sends data with a size less than or equal to the new cumulative value of the first credit limit to the second network device in the packet-distributed load sharing manner.

In some embodiments, within a preset time period, when the new cumulative value of the first credit limit is less than or equal to a first threshold, the first network device switches from the packet-distributed load sharing manner to a per-flow load sharing manner, and sends data to the second network device in the per-flow load sharing manner. To be specific, when the new cumulative value of the first credit limit indicates that the remaining space in the ordering cache in the second network device is zero or quite small, the first network device switches from the packet-distributed load sharing manner to the per-flow load sharing manner, and sends data to the second network device in the per-flow load sharing manner.

When a bandwidth margin in the second network device is considered, after receiving the request information from the first network device, the second network device determines a second credit limit allocated to the first network device, where the second credit limit is an amount of data that is allowed to be sent by the first network device to a port of the second network device.

In some embodiments, the second network device may determine, based on a quantity of request information and the bandwidth margin in the second network device, the second credit limit allocated to the first network device, where the bandwidth margin indicates an amount of data that the port of the second network device can still receive. For example, the second network device may count a quantity of simultaneously received request information, and allocate all or some of the bandwidth margin evenly to first network devices that send the request information. For another example, the second network device may count a quantity of request information received within a comparatively short period of time, and allocate, to first network devices that send the request information, all or some of the bandwidth margin evenly or based on different weights (for example, the weights are allocated based on data priorities or request information arrival time). For another example, the first network device and the second network device may agree on a preset credit limit. After receiving the request message, the second network device may directly allocate a bandwidth limit of the preset credit limit to the first network device. The preset credit limit may be set to a comparatively small value, so that the second network device can receive data sent by the first network device.

In some other embodiments, the request information sent by the first network device indicates a requested amount, where the requested amount is an amount of data that the first network device requests to send. In this way, the second network device may determine, based on a bandwidth margin and the requested amount, the second credit limit allocated to the first network device.

The second network device determines a second sequence number based on the second credit limit. The second sequence number is used to indicate a sum of an amount of data that the second network device has authorized the first network device to send to a port of the second network device and an amount of data that the second network device authorizes the first network device to send to a port of the second network device this time.

In some embodiments, when the second credit limit indicates that there is available bandwidth, the second network device generates one second sequence number, and sends the second sequence number to the first network device by using the grant information, until the second credit limit is all allocated. In this case, each second sequence number represents one unit credit limit. The unit credit limit may be configured. For example, the unit credit limit may be configured to 1 KB, 2 KB, 4 KB, 8 KB, or 16 KB.

In some other embodiments, when the second credit limit indicates that there is available bandwidth, the second network device generates one second sequence number, directly allocates all of the second credit limit, and sends the second sequence number to the first network device by using the grant information. In this case, the second sequence number represents at least one unit credit limit.

In some other embodiments, when the second credit limit indicates that there is available bandwidth, the second network device generates a plurality of second sequence numbers. When a cumulative credit limit represented by a last second sequence number reaches an allowed-to-be-sent threshold, the second network device sends the last second sequence number by using the grant information.

After receiving the grant information sent by the second network device, the first network device determines the second credit limit based on the second sequence number in the grant information. The first network device sends data to the second network device based on the first credit limit and the second credit limit. Specifically, the first network device determines the second credit limit based on a difference between the second sequence number and a largest second sequence number already received by the first network device.

In some embodiments, the first network device sends data to the second network device based on a smaller one between the first credit limit and the second credit limit.

In some other embodiments, when the first credit limit is less than the second credit limit, and a difference between the first credit limit and the second credit limit is greater than a second threshold, the first network device switches from the packet-distributed load sharing manner to a per-flow load sharing manner, and sends data to the second network device in the per-flow load sharing manner. To be specific, when the first credit limit is less than the second credit limit, and the difference between the first credit limit and the second credit limit is quite large, the first network device switches from the packet-distributed load sharing manner to the per-flow load sharing manner, and sends data to the second network device in the per-flow load sharing manner.

After receiving the grant information sent by the second network device, the first network device determines the second credit limit based on the second sequence number in the grant information, to obtain a cumulative value of the second credit limit. Specifically, the first network device compares the second sequence number with the largest second sequence number already received by the first network device. When the second sequence number is greater than the largest second sequence number already received by the first network device, the first network device adds, to a previous cumulative value of the second credit limit, a data amount corresponding to the difference between the second sequence number and the largest second sequence number, to obtain a new cumulative value of the second credit limit, and updates the largest second sequence number to the second sequence number; or when the second sequence number is less than or equal to the largest second sequence number already received by the second network device, the first network device does not update the cumulative value of the second credit limit or the largest second sequence number.

The first network device sends data to the second network device based on the new cumulative value of the first credit limit and the new cumulative value of the second credit limit.

It should be understood that because the first network device continuously transmits data after receiving the grant information, the cumulative value of the first credit limit and the cumulative value of the second credit limit also keep changing. That the first network device sends data to the second network device based on the new cumulative value of the first credit limit and the new cumulative value of the second credit limit may be that the first network device sends data to the second network device based on a current cumulative value of the first credit limit and a current cumulative value of the second credit limit.

In some embodiments, the first network device sends data to the second network device based on a smaller one between the new cumulative value of the first credit limit and the new cumulative value of the second credit limit.

In some other embodiments, when the new cumulative value of the first credit limit is less than the new cumulative value of the second credit limit, and a difference between the new cumulative value of the first credit limit and the new cumulative value of the second credit limit is greater than a second threshold, the first network device switches from the packet-distributed load sharing manner to a per-flow load sharing manner, and sends data to the second network device in the per-flow load sharing manner. To be specific, when the new cumulative value of the first credit limit is less than the new cumulative value of the second credit limit, and the difference between the new cumulative value of the first credit limit and the new cumulative value of the second credit limit is quite large, the first network device switches from the packet-distributed load sharing manner to the per-flow load sharing manner, and sends data to the second network device in the per-flow load sharing manner.

After the first network device switches to the per-flow load sharing manner in the foregoing various cases, if a state in which a queue is empty remains for a period of time (the period of time is configurable) after current traffic is all sent, that is, no new traffic enters the queue within the period of time, the first network device switches back to the packet-distributed load sharing manner from the per-flow load sharing manner.

It should be understood that when the ordering cache is not considered, the first network device may alternatively send data to the second network device only based on the second credit limit or the current cumulative value of the second credit limit.

Figure 5:
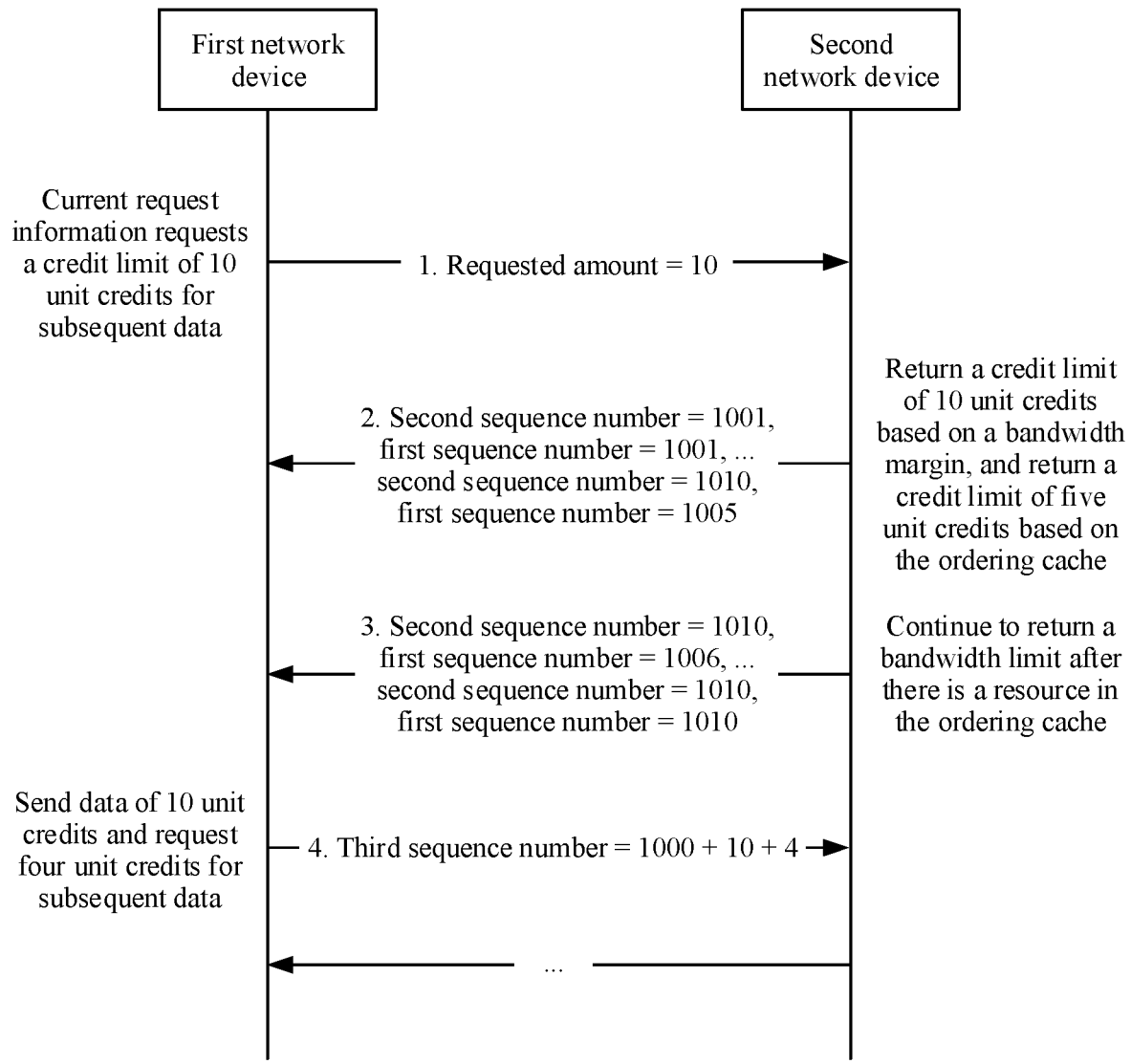
FIG. 5 shows a specific example of a data transmission method according to an embodiment of this application.

FIG. 5 describes the data transmission method according to this embodiment of this application with reference to a specific example. For example, the second network device determines a credit limit based on the bandwidth margin and the remaining space in the ordering cache. As shown in FIG. 5, assuming that current request information requests a credit limit of 10 unit credits, the second network device can return a credit limit of 10 unit credits based on the bandwidth margin, and can temporarily return a credit limit of five unit credits based on the remaining space in the ordering cache, and subsequently, with release of the ordering cache and with sufficient resources, can continue to return grant information. Optionally, with an available credit limit, the first network device can send a data packet, and the data packet carries latest request information.

When a new device goes online, and dynamic configuration (in a data center (DC) scenario, a limited VOQ adapting to a large quantity of flows) is performed for a virtual output queue (VOQ) of the first network device or periodic synchronization is performed for enhancing reliability, a cumulative base of the first network device and a cumulative base of the second network device may be out of synchronization. Therefore, the first network device and the second network device need to perform a procedure of synchronizing the cumulative bases.

The second network device generates the cumulative base. Optionally, the second network device generates the cumulative base randomly.

The second network device determines the first sequence number based on the cumulative base and the first credit limit, and determines the second sequence number based on the cumulative base and the second credit limit. After receiving the grant information, the first network device determines the cumulative base based on the first sequence number or the second sequence number. When there is new data that needs to be sent, the first network device determines a third sequence number based on the cumulative base, an amount requested previous time, and an amount requested this time.

Optionally, the first sequence number is a sum of the cumulative base, the amount of data that the second network device has authorized the first network device to send in the packet-distributed load sharing manner, and the amount of data that the second network device authorizes the first network device to send in the packet-distributed load sharing manner this time; the second sequence number is a sum of the cumulative base, the amount of data that the second network device has authorized the first network device to send to a port of the second network device, and the amount of data that the second network device authorizes the first network device to send to a port of the second network device this time; and the third sequence number is a sum of the cumulative base, an amount of data that the first network device has requested to send, and the amount requested this time.

Before the cumulative base of the first network device is synchronized with the cumulative base of the second network device, the request information carries the requested amount, and the grant information carries the first sequence number and/or the second sequence number; and after the cumulative base of the first network device is synchronized with the cumulative base of the second network device, the request information carries the third sequence number, and the grant information carries the first sequence number and/or the second sequence number.

Figure 6:
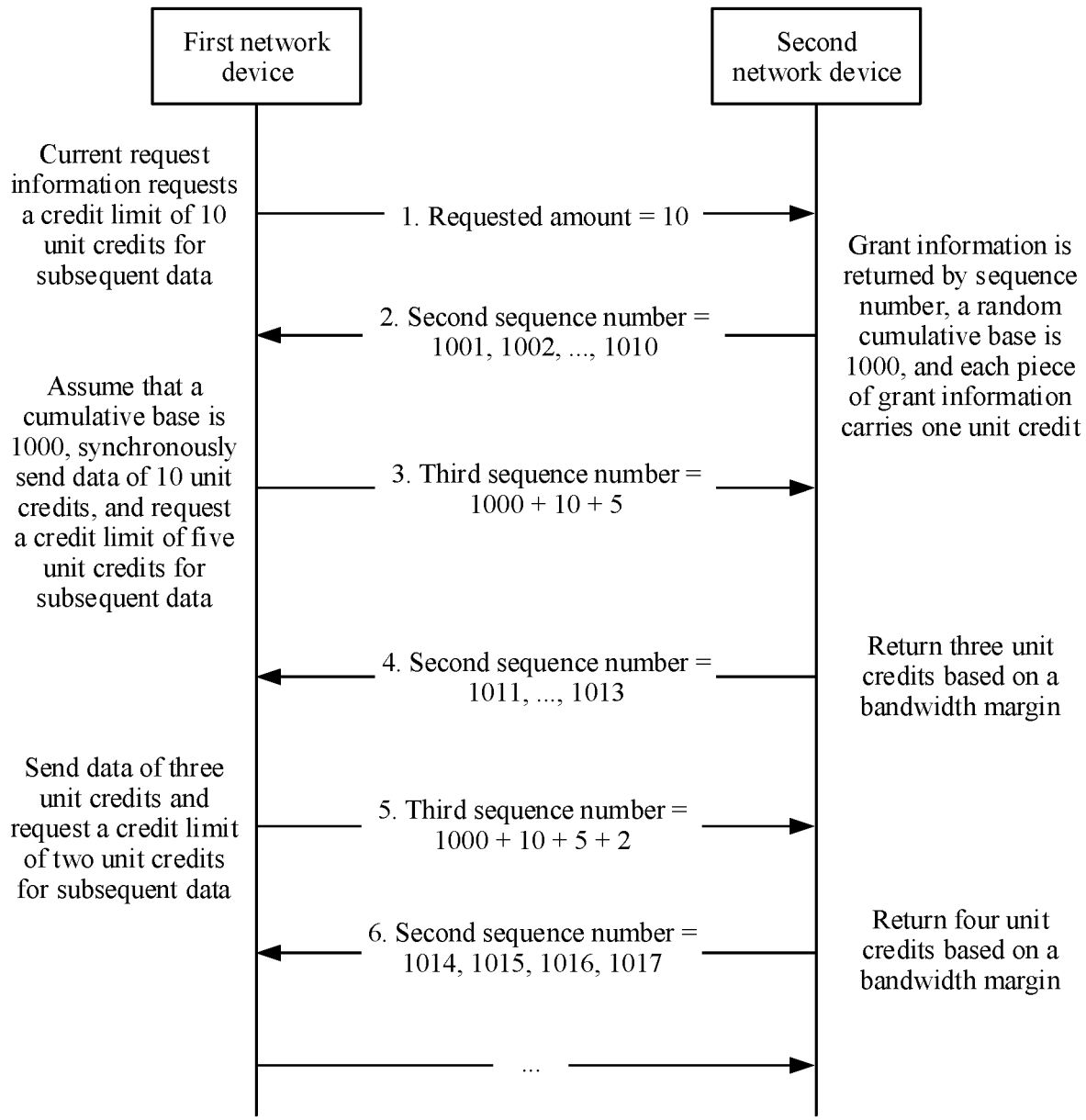
FIG. 6 is a schematic flowchart of cumulative base synchronization according to an embodiment of this application.

FIG. 6 is a schematic flowchart of cumulative base synchronization according to this embodiment of this application. For example, the second network device determines, based on the bandwidth margin, the second credit limit allocated to the first network device. As shown in FIG. 6, before the synchronization, it is assumed that current request information requests a credit limit of 10 unit credits. After receiving the request information, the second network device determines, based on the bandwidth margin, that a credit limit of 10 unit credits can be allocated to the first network device. For example, the credit limit is returned in a form of the second sequence number, and each second sequence number represents one unit credit. In this case, the second network device returns 10 pieces of grant information, and second sequence numbers in the 10 pieces of grant information are 1001, 1002, . . . , and 1010, respectively. After receiving the grant information, the first network device determines that the cumulative base is 1000, considers that synchronization can be performed, and next time, sends the request information in a form of the third sequence number. Assuming that the first network device requests a credit limit of five unit credits again for subsequent data, in addition to the credit limit of 10 unit credits requested historically, new request information carries the third sequence number of 1015 (1000+10+5=1015). After receiving the new request information, the second network device determines, based on the bandwidth margin, that a credit limit of three unit credits can be allocated to the first network device. Because a credit limit of 10 unit credits has been allocated to the first network device, a second sequence number in the first piece of grant information corresponding to the new request information is 1013 (1000+10+3=1013).

Optionally, the first network device records and updates a smallest second sequence number. After receiving a specific quantity of grant information, the first network device determines a current smallest second sequence number as the cumulative base.

In some embodiments, the grant information may carry both the first sequence number and the second sequence number. Based on an enabled packet distribution function and/or an enabled request-grant function, the first network device transmits data based on the first sequence number and/or the second sequence number. For example, when the packet distribution function is enabled on the first network device, the first network device determines the first credit limit based on the first sequence number, and then sends data to the second network device based on the first credit limit. For another example, when the packet distribution function and the request-grant flow control function are enabled, the first network device determines the first credit limit based on the first sequence number, determines the second credit limit based on the second sequence number, and then sends data to the second network device based on the first credit limit and the second credit limit. For another example, when the request-grant flow control function is enabled, the first network device determines the second credit limit based on the second sequence number, and then sends data to the second network device based on the second credit limit.

Before the first network device sends the request information to the second network device, the packet distribution function and/or the request-grant flow control function are/is enabled on the first network device depending on different circumstances. For example, for delay-insensitive traffic, when there is a comparatively large quantity of emergencies, or when destination addresses of a plurality of source-end devices indicate one destination-end device, the request-grant flow control function is enabled; for delay-sensitive and comparatively simple traffic, the request-grant flow control function is not enabled; for a service with a comparatively large quantity of elephant flows, the packet switching function is enabled; and for a service without an elephant flow or with a comparatively small quantity of elephant flows, the packet distribution function is not enabled.

Figure 7:
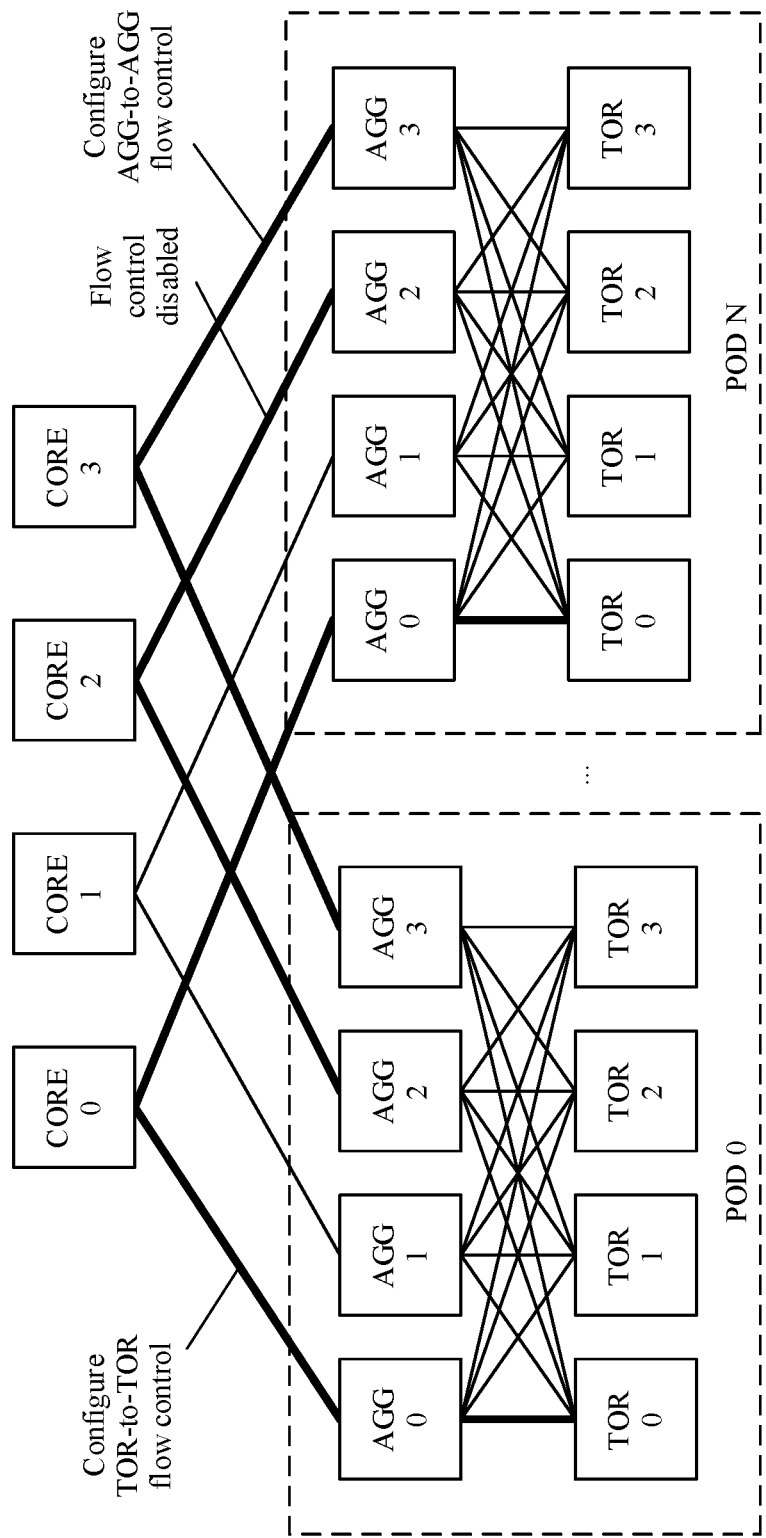
FIG. 7 is a schematic diagram of a configurable flow control solution according to an embodiment of this application.
Figure 8:
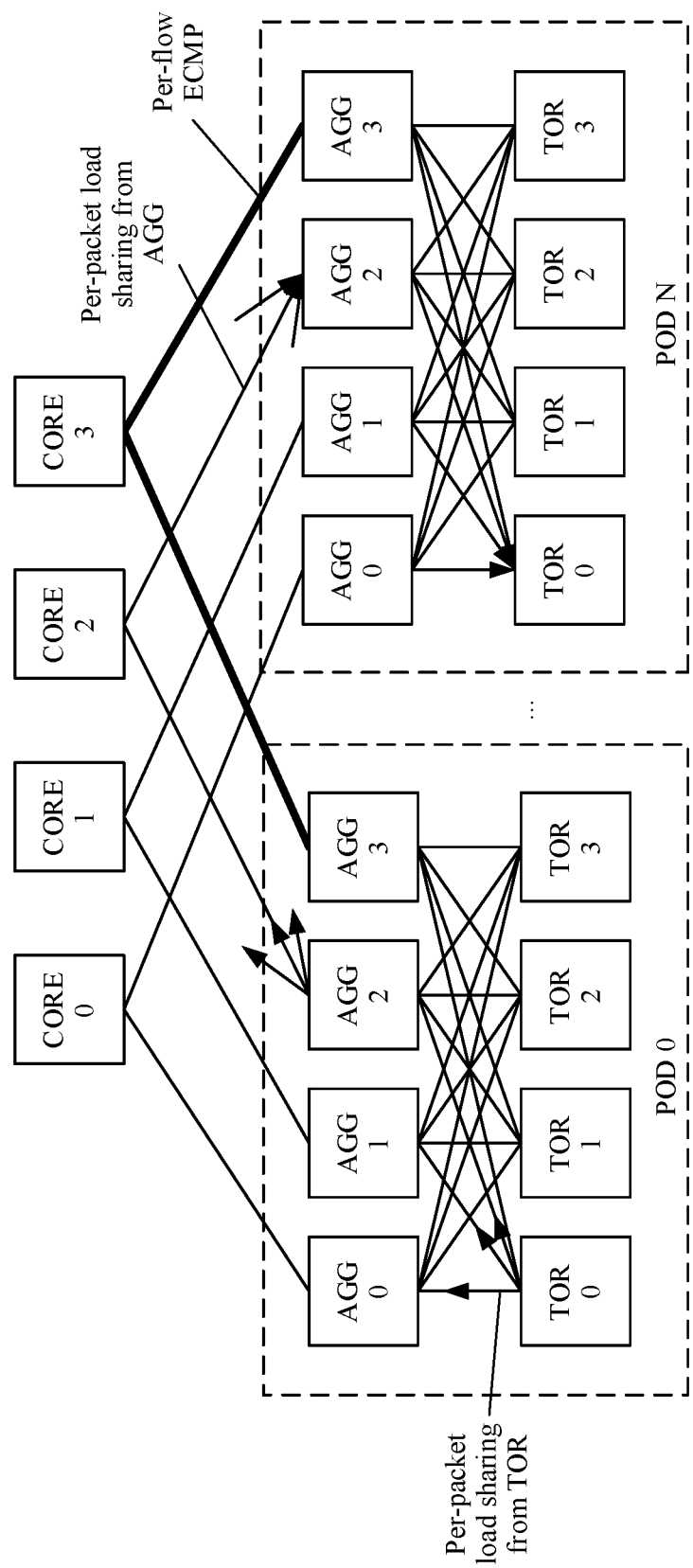
FIG. 8 is a schematic diagram of a configurable load sharing solution according to an embodiment of this application.

As shown in FIG. 7 and FIG. 8, the request-grant flow control function and the packet distribution function may be deployed on TOR-to-TOR or AGG-to-AGG, or may be supported by some PODs. For deployment location determining, the following needs to be considered: traffic models and delay requirements within and between PODs, and whether a TOR device or an AGG device supports the request-grant flow control function and/or the packet distribution function. It should be understood that for the packet distribution function, if packet distribution is started at a specific layer, reordering needs to be performed at the same layer.

It should be understood that flexible configuration of the request-grant flow control function and the packet distribution function in this embodiment of this application may be reflected in time (for example, different functions are enabled within different time periods) and paths/data flows/devices/ports, and the like (for example, different functions are enabled on different paths/data flows/devices/ports).

There are many methods for enabling the request-grant flow control function and/or the packet distribution function on the first network device. For example, the request-grant flow control function and/or the packet switching function may be enabled on the first network device by using a configuration message from a network management device; the request-grant flow control function and/or the packet switching function may be enabled on the first network device by using a control message from a control device; or the request-grant flow control function and/or the packet switching function may be enabled on the first network device by using a user instruction. This is not specifically limited in this embodiment of this application. In this embodiment of this application, the request-grant flow control function or the packet switching function may be separately enabled on the first network device, or both the request-grant flow control function and the packet switching function may be enabled on the first network device.

In some other embodiments, the request information further includes an enabling field, where the enabling field is used to indicate whether the packet switching function and/or the request-grant flow control function are/is enabled on the first network device. The second network device determines, based on the enabling field, whether to add the first sequence number and/or the second sequence number to the grant information, and the first network device does not need to perform determining again. For example, when the enabling field indicates that the packet distribution function is enabled on the first network device, the second network device adds the first sequence number to the grant information, and does not add the second sequence number. For another example, when the enabling field indicates that the packet distribution function and the request-grant flow control function are enabled on the first network device, the second network device adds the first sequence number and the second sequence number to the grant information. For another example, when the enabling field indicates that the request-grant flow control function is enabled on the first network device, the second network device adds the second sequence number to the grant information, and does not add the first sequence number.

Optionally, the enabling field may further indicate a deployment location of the request-grant flow control function and/or a deployment location of the packet switching function.

In some embodiments, the second network device releases the ordering cache. Optionally, after completing sending of data, the first network device sends a release message to the second network device. The release message includes an ordering cache release field, and the ordering cache release field is used to instruct the second network device to release the ordering cache, and indicate a size of the ordering cache that needs to be released. The second network device receives the release message sent by the first network device, and releases the ordering cache based on the release message. Optionally, when an unused time of the ordering cache exceeds a time threshold, the second network device releases the ordering cache whose unused time exceeds the time threshold, and sends a reclaim message to the first network device. The reclaim message includes an ordering cache reclaim field, and the ordering cache reclaim field is used to notify the first network device that the second network device reclaims the ordering cache and notify the first network device of a size of the reclaimed ordering cache. In the foregoing technical solution, the ordering cache can be released in a timely manner through end-to-end information exchange, thereby reducing a waiting time of subsequent data.

It should be understood that the release message and the reclaim message may be dedicated messages, or may be used as fields in the request information and the grant information.

In some other embodiments, the second network device may release the ordering cache automatically. Optionally, the second network device automatically reclaims the ordering cache after normally completing ordering of the data sent by the first network device. Optionally, when an unused time of the ordering cache exceeds a threshold, the second network device releases the ordering cache whose unused time exceeds the threshold. For example, if the second network device does not end an ordering task because of waiting for a packet, a timeout (timer) mechanism is triggered, and the ordering cache is forcibly reclaimed after a specific waiting time elapses.

Figure 9:
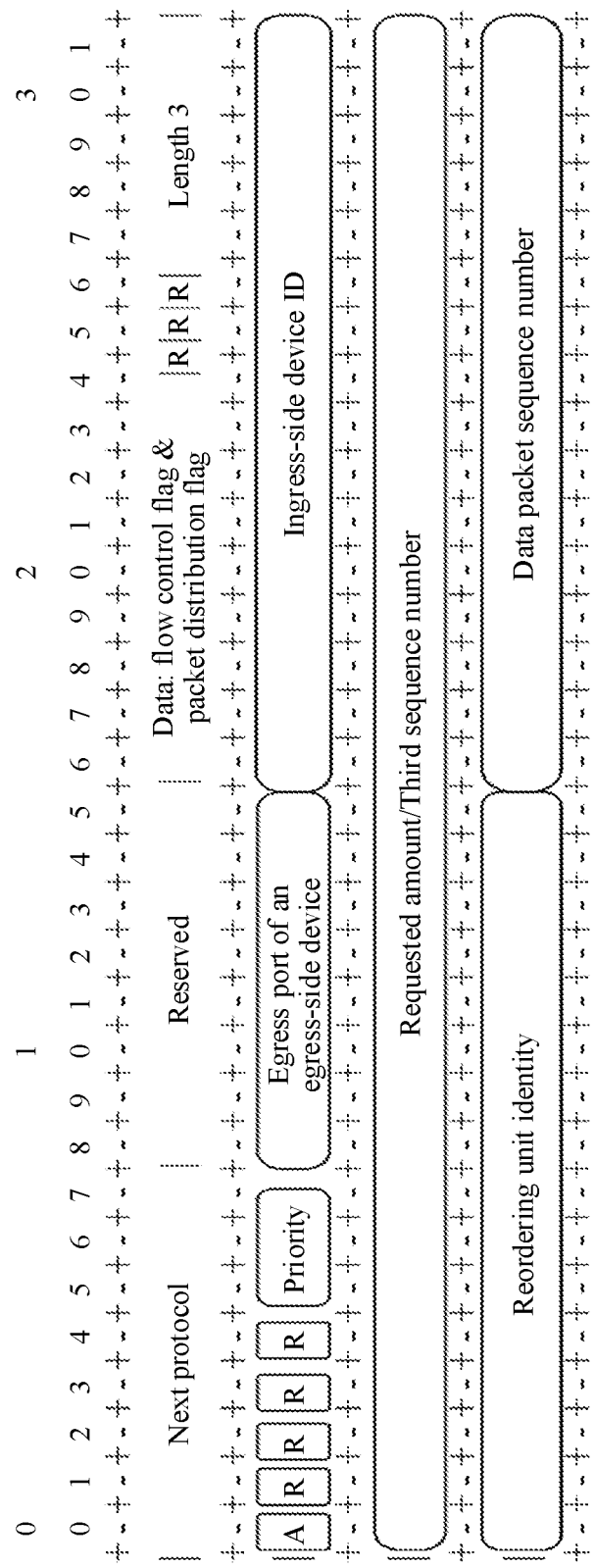
FIG. 9 shows fields in request information according to an embodiment of this application.

FIG. 9 shows fields in the request information according to this embodiment of this application, and sizes and locations of the fields. It should be understood that FIG. 9 is merely an example, and the request information in this embodiment of this application may include fewer or more fields, or may be in another composition form. As shown in FIG. 9, the request information in this embodiment of this application includes at least some of the following fields:

egress port of an egress-side device (destination port, DstPort) (optional): describes an egress port of an egress-side device, and may occupy 8 bits (bits);

ingress-side device ID (source device identity, SrcDevID): describes a unique identifier of an ingress-side device, and may occupy 16 bits;

requested amount (request credit, ReqCredit): increment in a quantity of requested unit credits; this field is used in a scenario in which SNs are not synchronized yet, for example, a new device going online and dynamic VOQ refreshing, and may occupy 12 bits;

request sequence number (ReqSN): the third sequence number, which is a current largest SN of a requested credit; this field is used in a scenario in which SNs have been synchronized, and can enhance reliability of data transmission; before SNs are synchronized, ReqCredit is used, and after SNs are synchronized, ReqSN is used; this field may occupy 32 bits;

unit credit (Credit size): a capacity size of each credit; this field may use an absolute value or a quantized value; a reference configuration may be 1 KB, 2 KB, 4 KB, 8 KB, 16 KB, or the like; this field may occupy 3 bits.

flow control flag (FC flag): describes whether the request-grant (request-grant) flow control function is enabled, and may occupy one bit;

flow control location (flow control place, FC_place) (optional, not shown): describes a deployment location of the request-grant flow control function, and may occupy one bit;

packet switching flag (packet spray flag, PS_flag): describes whether packet switching (packet spray, PS) load sharing is enabled, and may occupy one bit;

packet switching location (packet spray place, PS_place) (optional, not shown): describes a deployment location of packet-switched load sharing, and may occupy one bit;

priority: describes a priority of a data packet, and may occupy 3 bits, where the flow control flag, the flow control location, the packet distribution flag, and the packet distribution location constitute an enabling field. With the enabling field, a flow control solution and a load sharing solution shown in FIG. 7 and FIG. 8 can be configured; the request-grant flow control function and the packet switching function may be flexibly configured depending on different circumstances, and the second network device is notified of configuration information;

reordering unit identifier (source PS identity, SrcPSID): a unique identifier of a reordering unit; and data packet sequence number.

When the first network device receives the grant information and sends data in the packet-distributed load sharing manner, a reordering field is added to the sent data. The reordering field includes the reordering unit identifier and the data packet sequence number. The reordering unit may be an ingress port, a data flow, or another unit, or may be manually specified. The second network device performs reordering processing on data packets that have a same reordering unit identifier.

Figure 10:
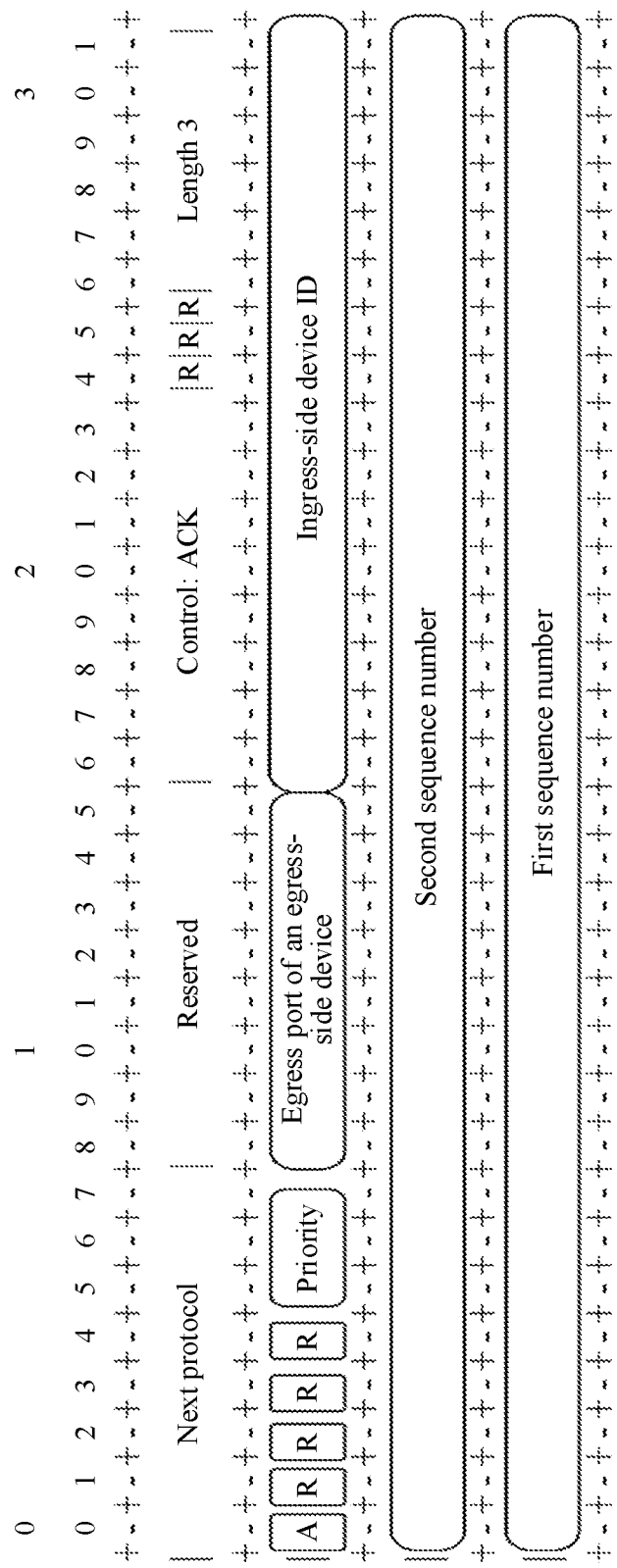
FIG. 10 shows fields in grant information according to an embodiment of this application.

FIG. 10 shows fields in the grant information according to this embodiment of this application. It should be understood that FIG. 10 is merely an example, and the request information in this embodiment of this application may include fewer or more fields, or may be in another composition form. As shown in FIG. 10, the request information in this embodiment of this application includes at least some of the following fields.

egress port of an egress-side device (destination port, DstPort): describes an egress port of an egress-side device, and may occupy 8 bits;

ingress-side device ID (source device identity, SrcDevID): describes a unique identifier of an ingress-side device, and may occupy 16 bits;

grant sequence number (GrntSN): the second sequence number; this field may occupy 32 bits; this field is used in a scenario in which SNs have been synchronized, and can enhance reliability of data transmission;

reordering sequence number (grant sequence number, GrntSN): the first sequence number; this field may occupy 32 bits; this field is used in a scenario in which SNs have been synchronized, and can enhance reliability of data transmission;

unit credit (Credit size) (optional, not shown): a capacity size of each credit; this field may use an absolute value or a quantized value; a reference configuration may be 1 KB, 2 KB, 4 KB, 8 KB, or 16 KB; this field may occupy 3 bits; and priority: describes a priority of a data packet, and may occupy 3 bits.

It should be understood that a credit limit being represented by a unit credit and a quantity of unit credits (for example, if the credit unit is 2 KB and the quantity of credit units is 3, the credit limit is 6 KB) in FIG. 9 and FIG. 10 is merely an example. A credit limit in this embodiment of this application may be alternatively represented in any other possible manner.

Figure 11:
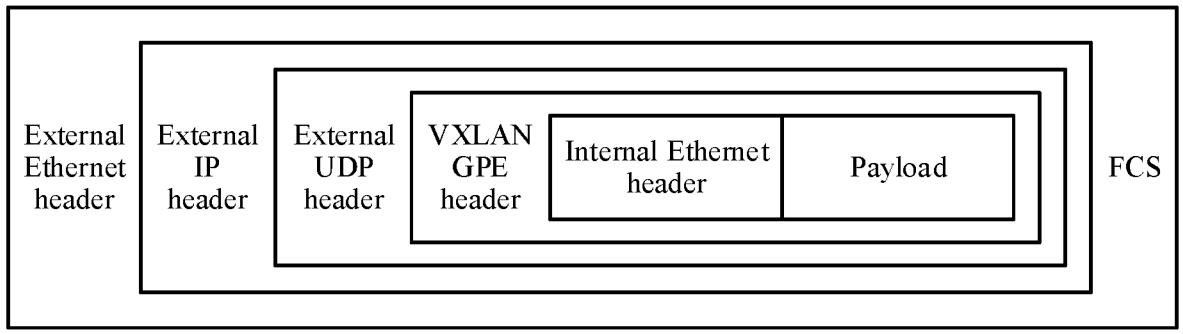
FIG. 11 shows VXLAN-GPE encapsulation that is based on a standard Ethernet packet.
Figure 12:
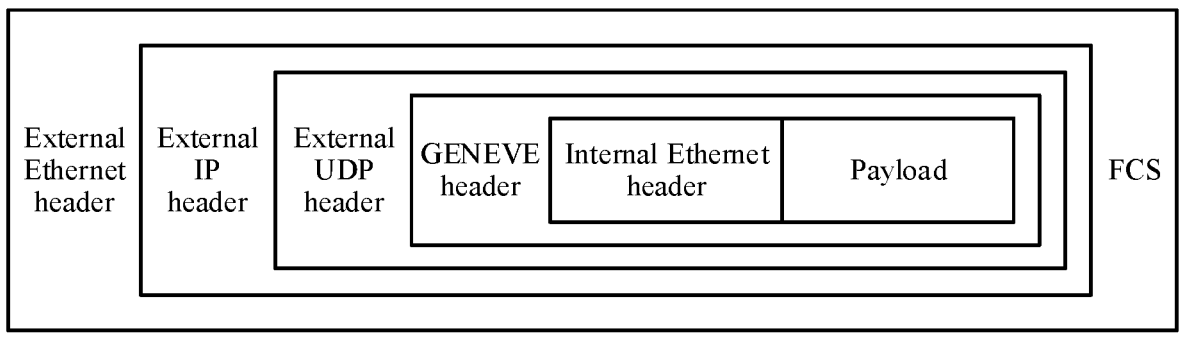
FIG. 12 shows GENEVE encapsulation that is based on a standard Ethernet packet.

In some embodiments, standard virtual extensible local area network generic protocol extension encapsulation or standard generic network virtualization encapsulation is used for a packet carrying the request information and a packet carrying the grant information. FIG. 11 shows virtual extensible local area network generic protocol extension (VXLAN-GPE) encapsulation that is based on a standard Ethernet packet. FIG. 12 shows generic network virtualization encapsulation (GENEVE) that is based on a standard Ethernet. As shown in FIG. 11 and FIG. 12, in this embodiment of this application, VXLAN-GPE encapsulation or GENEVE encapsulation is performed on a valid payload (each field in this embodiment of this application is carried in a VXLAN-GPE header or a GENEVE header) on a basis of a standard Ethernet packet format (including an external ethernet header, an external internet protocol (IP) header, an external user datagram protocol (UDP) header, an internal Ethernet header, a frame check sequence (FCS), and the like), to facilitate transmission of various information (for example, the request information and the grant information) in this embodiment of this application.

Specifically, the VXLAN-GPE header or the GENEVE header may be carried in a data packet, or may be encapsulated by the first network device. Therefore, in this embodiment of this application, distinguishing is performed by using a distinguish field (for example, a field A in FIG. 9 or FIG. 10, and may occupy one bit). For example, when the distinguish field is 0, it indicates that the VXLAN header or the GENEVE header is carried in a data packet; or when the distinguish field is 1, it indicates that the VXLAN header or the GENEVE header is encapsulated by the first network device on which the request-grant flow control function and/or the packet switching function are/is enabled.

Network devices in a data center network may be from different device vendors, and network devices of different device vendors may support different packet formats. Therefore, in the foregoing technical solution, sending and receiving messages in a standard Ethernet packet format can avoid difficulty in interaction between devices of different vendors.

Figure 13:
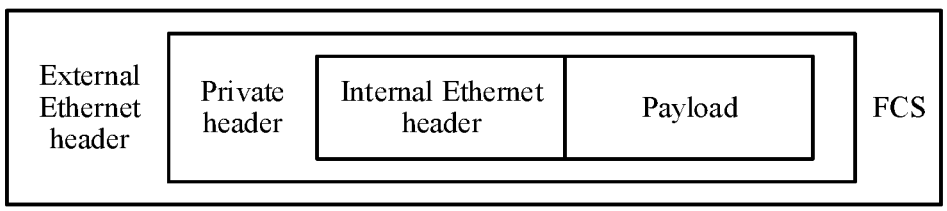
FIG. 13 shows a format of an Ethernet packet with private header encapsulation.

In some other embodiments, various information or messages in this embodiment of this application, for example, the request information, the grant information, the release message, and the reclaim message, may be in a format of an Ethernet packet with a private header. FIG. 13 shows a format of an Ethernet packet with private header encapsulation.

In addition, in some other embodiments, the first network device may alternatively not send the request information, and the second network device sends the grant information to the first network device at a scheduled time or periodically. This is not limited in this embodiment of this application.

The foregoing describes in detail the data transmission method in the embodiments of this application. The following describes in detail network devices in the embodiments of this application with reference to FIG. 14 to FIG. 18. The network devices in the embodiments of this application may perform the foregoing various methods.

Figure 14:
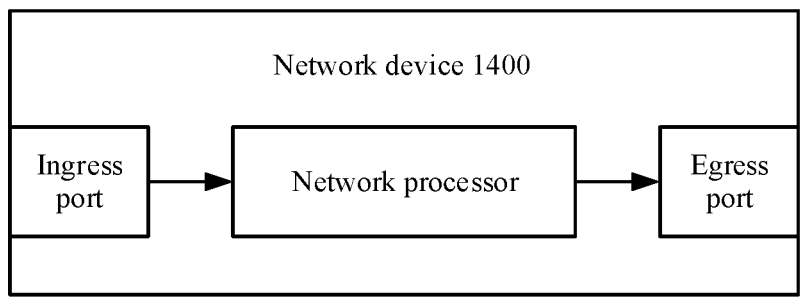
FIG. 14 is a logical diagram of a network device according to an embodiment of this application.

FIG. 14 is a logical diagram of a network device according to an embodiment of this application. As shown in FIG. 14, a data packet enters a network device from an ingress port, and a network processor performs path selection and scheduling. There is a traffic scheduler inside the processor, and the traffic scheduler may allocate a specific amount of traffic to be sent from a specific egress port. The network processor may be a chip in the network device. Various methods in the embodiments of this application may be applied to the network processor.

Optionally, the network processor in this embodiment of this application is the network device.

Figure 15:
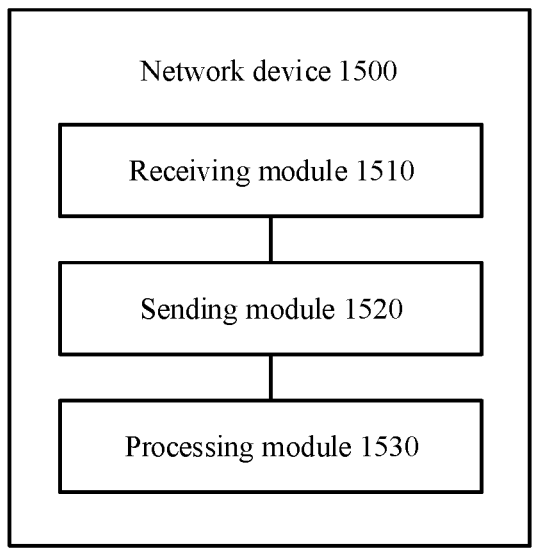
FIG. 15 is a schematic structural diagram of a network device according to an embodiment of this application.

FIG. 15 is a schematic structural diagram of a network device according to an embodiment of this application. The network device 1500 shown in FIG. 15 may correspond to the foregoing first network device. As shown in FIG. 15, the network device 1500 includes a receiving module 1510, a sending module 1520, and a processing module 1530.

The sending module 1520 is configured to send request information to a second network device, where the request information is used to request to send data.

The receiving module 1510 is configured to receive, by the first network device, grant information sent by the second network device, where the grant information includes a first sequence number.

The processing module 1530 is configured to determine, by the first network device, a first credit limit based on the first sequence number, where the first credit limit is an amount of data that is allowed to be sent by the first network device in a packet-distributed load sharing manner.

The sending module 1520 is further configured to send data to the second network device based on the first credit limit.

Optionally, the processing module 1530 is specifically configured to: when the first sequence number is greater than a largest first sequence number already received by the first network device, determine, by the first network device, the first credit limit based on a difference between the first sequence number and the largest first sequence number.

Optionally, the sending module 1520 is specifically configured to: within a preset time period, when the first credit limit is less than or equal to a first threshold, switch from the packet-distributed load sharing manner to a per-flow load sharing manner, and send data to the second network device in the per-flow load sharing manner.

Optionally, the grant information further includes a second sequence number. Optionally, the processing module 1530 is further configured to determine a second credit limit based on the second sequence number, where the second credit limit is an amount of data that is allowed to be sent by the first network device to a port of the second network device. The sending module 1520 is specifically configured to send data to the second network device based on the first credit limit and the second credit limit.

Optionally, the processing module 1530 is further configured to: when the second sequence number is greater than a largest second sequence number already received by the first network device, determine, by the first network device, the second credit limit based on a difference between the second sequence number and the largest second sequence number.

Optionally, the sending module 1520 is specifically configured to: send data to the second network device based on a smaller one between the first credit limit and the second credit limit; or when the first credit limit is less than the second credit limit, and a difference between the first credit limit and the second credit limit is greater than a second threshold, switch, by the first network device, from the packet-distributed load sharing manner to a per-flow load sharing manner, and send data to the second network device in the per-flow load sharing manner.

Optionally, the processing module 1530 is further configured to: after the first network device receives the grant information sent by the second network device, when the first sequence number is greater than the largest first sequence number, update the largest first sequence number to the first sequence number; and when the second sequence number is greater than the largest second sequence number, update the largest second sequence number to the second sequence number.

Optionally, the request information further includes an enabling field, where the enabling field is used to indicate whether a packet distribution function and/or a request-grant flow control function are/is enabled on the first network device.

Optionally, the request information is further used to indicate a requested amount, where the requested amount is an amount of data that the first network device requests to send.

Optionally, before a cumulative base of the first network device is synchronized with a cumulative base of the second network device, the request information includes the requested amount; and the processing module 1530 is further configured to: after the first network device receives the grant information, determine the cumulative base based on the first sequence number or the second sequence number, where the cumulative base is used to determine a third sequence number, and the third sequence number is a sum of the cumulative base, an amount of data that the first network device has requested to send, and an amount requested this time.

Optionally, after a cumulative base of the first network device is synchronized with a cumulative base of the second network device, the request information includes a third sequence number, where the third sequence number is a sum of the cumulative base, an amount of data that the first network device has requested to send, and an amount requested this time.

Optionally, standard virtual extensible local area network generic protocol extension encapsulation or standard generic network virtualization encapsulation is used for a packet carrying the request information and a packet carrying the grant information.

The receiving module 1510 and the sending module 1520 may be implemented by a transceiver. The processing module 1530 may be implemented by a processor. For specific functions and beneficial effects of the receiving module 1510, the sending module 1520, and the processing module 1530, refer to the method shown in FIG. 4. Details are not described herein again.

Figure 16:
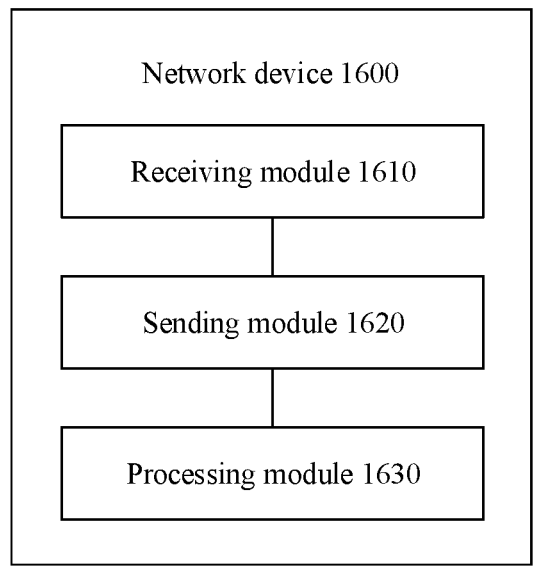
FIG. 16 is a schematic structural diagram of a network device according to an embodiment of this application.

FIG. 16 is a schematic structural diagram of a network device according to an embodiment of this application. The network device 1600 in FIG. 16 may correspond to the foregoing second network device. As shown in FIG. 16, the network device 1600 includes a receiving module 1610, a sending module 1620, and a processing module 1630.

The receiving module 1610 is configured to receive request information sent by a first network device, where the request information is used to request to send data.

The processing module 1630 is configured to determine a first credit limit, where the first credit limit is an amount of data that is allowed to be sent by the first network device in a packet-distributed load sharing manner.

The processing module 1630 is further configured to determine a first sequence number based on the first credit limit, where the first sequence number is used to indicate a sum of an amount of data that the second network device has authorized the first network device to send in the packet-distributed load sharing manner and an amount of data that the second network device authorizes the first network device to send in the packet-distributed load sharing manner this time.

The sending module 1620 is configured to send grant information to the first network device, where the grant information includes the first sequence number.

Optionally, the processing module 1630 is specifically configured to: determine that the first credit limit is a first preset limit; or determine the first credit limit based on a remaining space in an ordering cache and the request information, where the ordering cache is configured to reorder out-of-order data.

Optionally, the grant information further includes a second sequence number, where the second sequence number is used to indicate a sum of an amount of data that the second network device has authorized the first network device to send to a port of the second network device and an amount of data that the second network device authorizes the first network device to send to a port of the second network device this time; and the processing module 1630 is further configured to: determine a second credit limit, where the second credit limit is an amount of data that is allowed to be sent by the first network device to a port of the second network device; and determine the second sequence number based on the second credit limit.

Optionally, the processing module 1630 is specifically configured to: determine that the second credit limit is a second preset limit; or determine the second credit limit based on a bandwidth margin and the request information.

Optionally, the request information further includes an enabling field, where the enabling field is used to indicate whether a packet switching function and/or a request-grant flow control function are/is enabled on the first network device.

Optionally, the request information is further used to indicate a requested amount, where the requested amount is an amount of data that the first network device requests to send; and the processing module 1630 is specifically configured to: determine the first credit limit based on the remaining space in the ordering cache and the requested amount; and determine the second credit limit based on the bandwidth margin and the requested amount.

Optionally, before a cumulative base of the first network device is synchronized with a cumulative base of the second network device, the request information includes the requested amount; the processing module 1630 is further configured to generate the cumulative base; the processing module 1630 is specifically configured to determine the first sequence number based on the cumulative base and the first credit limit; and the processing module 1630 is specifically configured to determine the second sequence number based on the cumulative base and the second credit limit.

Optionally, after a cumulative base of the first network device is synchronized with a cumulative base of the second network device, the request information includes a third sequence number, where the third sequence number is a sum of the cumulative base, an amount of data that the first network device has requested to send, and an amount requested this time.

Optionally, standard virtual extensible local area network generic protocol extension encapsulation or standard generic network virtualization encapsulation is used for a packet carrying the request information and a packet carrying the grant information.

The receiving module 1610 and the sending module 1620 may be implemented by a transceiver. The processing module 1630 may be implemented by a processor. For specific functions and beneficial effects of the receiving module 1610, the sending module 1620, and the processing module 1630, refer to the method shown in FIG. 4. Details are not described herein again.

Figure 17:
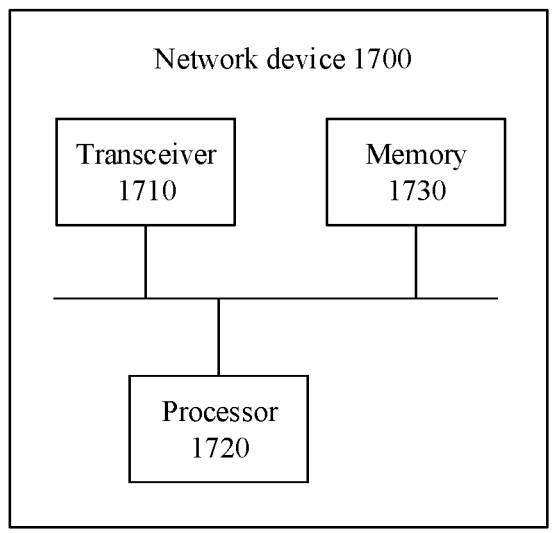
FIG. 17 is a schematic structural diagram of a network device according to another embodiment of this application.

FIG. 17 is a schematic structural diagram of a network device according to another embodiment of this application. As shown in FIG. 17, the network device 1700 includes a transceiver 1710, a processor 1720, and a memory 1730.

FIG. 17 shows only one memory and one processor. In an actual network device product, there may be one or more processors and one or more memories. The memory may also be referred to as a storage medium, a storage device, or the like. The memory may be disposed independently of the processor, or may be integrated with the processor. This is not limited in this embodiment of this application.

The transceiver 1710, the processor 1720, and the memory 1730 communicate with each other over an internal connection channel, to transfer a control signal and/or a data signal.

Specifically, the transceiver 1710 is configured to: send request information to a second network device, where the request information is used to request to send data; and receive, by a first network device, grant information sent by the second network device, where the grant information includes a first sequence number.

The processor 1730 is configured to determine, by the first network device, a first credit limit based on the first sequence number, where the first credit limit is an amount of data that is allowed to be sent by the first network device in a packet-distributed load sharing manner.

The transceiver 1710 is further configured to send data to the second network device based on the first credit limit. For a specific working process and beneficial effects of the network device 1700, refer to a description of the embodiment shown in FIG. 4.

Figure 18:
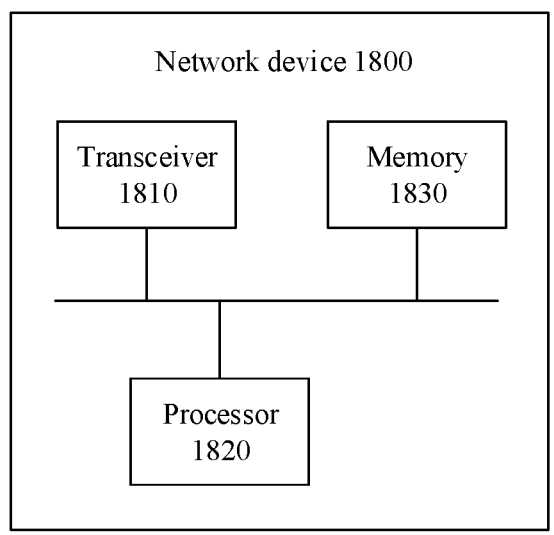
FIG. 18 is a schematic structural diagram of a network device according to another embodiment of this application.

FIG. 18 is a schematic structural diagram of a network device according to another embodiment of this application. As shown in FIG. 18, the network device 1800 may include a transceiver 1810, a processor 1820, and a memory 1830.

FIG. 18 shows only one memory and one processor. In an actual control device product, there may be one or more processors and one or more memories. The memory may also be referred to as a storage medium, a storage device, or the like. The memory may be disposed independently of the processor, or may be integrated with the processor. This is not limited in this embodiment of this application.

The transceiver 1810, the processor 1820, and the memory 1830 communicate with each other over an internal connection channel, to transfer a control signal and/or a data signal.

Specifically, the transceiver 1810 is configured to receive request information sent by a first network device, where the request information is used to request to send data.

The processor 1830 is configured to determine a first credit limit, where the first credit limit is an amount of data that is allowed to be sent by the first network device in a packet-distributed load sharing manner; and the processor 1820 is further configured to determine a first sequence number based on the first credit limit, where the first sequence number is used to indicate a sum of an amount of data that a second network device has authorized the first network device to send in the packet-distributed load sharing manner and an amount of data that the second network device authorizes the first network device to send in the packet-distributed load sharing manner this time.

The transceiver 1810 is configured to send grant information to the first network device, where the grant information includes the first sequence number.

For a specific working process and beneficial effects of the network device 1800, refer to a description of the embodiment shown in FIG. 4.

The transceiver in the embodiments of this application may also be referred to as a transceiver unit, a transceiver, a transceiver apparatus, or the like. The processor may also be referred to as a processing unit, a processing board, a processing module, a processing apparatus, or the like. Optionally, in the transceiver, a component configured to implement a reception function may be considered as a receiving unit, and a component configured to implement a sending function may be considered as a sending unit. In other words, the transceiver includes the receiving unit and the sending unit. The receiving unit may also be referred to as a receiver, a receiver, a receiver circuit, or the like sometimes. The sending unit may also be referred to as a transmitter, a transmitter, a transmitter circuit, or the like sometimes.

The memory in the embodiments of this application is configured to store a computer instruction and a parameter that are required for processor running.

The processor in the embodiments of this application may be an integrated circuit chip and has a signal processing capability. In an implementation process, the steps in the foregoing methods may be implemented by using a hardware integrated logic circuit in the processor, or by using instructions in a form of software. The processor in the embodiments of this application may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, the steps, and logical block diagrams that are disclosed in the embodiments of this application. The general-purpose processor may be a microprocessor, or the processor may be any conventional processor or the like. Steps of the methods disclosed with reference to the embodiments of this application may be directly executed and accomplished by a hardware decoding processor, or may be executed and accomplished by using a combination of hardware and software modules in the decoding processor. A software module may be located in a mature storage medium in the art, such as a random access memory (RAM), a flash memory, a read-only memory (ROM), a programmable read-only memory, an electrically erasable programmable memory, a register, or the like. The storage medium is located in the memory, and a processor reads instructions in the memory and completes the steps in the foregoing methods in combination with hardware of the processor.

In various embodiments of this application, sequence numbers of the processes do not mean execution sequences in various embodiments of this application. The execution sequences of the processes should be determined based on functions and internal logic of the processes, and should not be construed as any limitation on the implementation processes of the embodiments of this application.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (solid state disk, SSD)), or the like.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method comprising:
    sending, by a first network device, request information to a second network device, wherein the request information is used to request to send data;
    receiving, by the first network device, grant information sent by the second network device, wherein the grant information comprises first and second sequence numbers;
    in response to the first sequence number being greater than a largest first sequence number previously received by the first network device, determining, by the first network device, a first credit limit based on a difference between the first sequence number and the largest first sequence number,
        wherein the first credit limit is an amount of data allowed to be sent by the first network device in a packet-distributed load sharing manner; and
    in response to the second sequence number being greater than a largest second sequence number previously received by the first network device, determining, by the first network device, a second credit limit based on a difference between the second sequence number and the largest second sequence number,
        wherein the second credit limit is an amount of data allowed to be sent by the first network device to a port of the second network device; and
    sending, by the first network device, data to the second network device based on the first and second credit limits.

2. The method according to claim 1, wherein sending data to the second network device based on the first credit limit comprises:
    within a preset time period, upon the first credit limit being less than or equal to a first threshold, switching, by the first network device, from the packet-distributed load sharing manner to a per-flow load sharing manner, and sending data to the second network device in the per-flow load sharing manner.

3. The method according to claim 1, wherein sending the data to the second network device based on the first credit limit and the second credit limit comprises:
    sending, by the first network device, data to the second network device based on a lesser one between the first credit limit and the second credit limit; or
    in response to the first credit limit being less than the second credit limit, and a difference between the first credit limit and the second credit limit being greater than a second threshold, switching, by the first network device, from the packet-distributed load sharing manner to a per-flow load sharing manner, and sending data to the second network device in the per-flow load sharing manner.

4. The method according to claim 1, wherein after receiving the grant information sent by the second network device, the method further comprises:
    upon the first sequence number being greater than the largest first sequence number, updating, by the first network device, the largest first sequence number to the first sequence number; and
    upon the second sequence number being greater than the largest second sequence number, updating, by the first network device, the largest second sequence number to the second sequence number.

5. The method according to claim 1, wherein the request information further comprises one or both of an enabling field indicating whether a packet distribution function and a request-grant flow control function are/is enabled on the first network device.

6. The method according to claim 1, wherein the request information further indicates a requested amount of data that the first network device requests to send.

7. The method according to claim 6, wherein before synchronizing a cumulative base of the first network device and a cumulative base of the second network device, the request information comprises the requested amount; and
    after receiving the grant information, the method further comprises:
    determining, by the first network device, the cumulative base based on the first sequence number or the second sequence number,
        wherein the cumulative base is used to determine a third sequence number, and
        wherein the third sequence number is a sum of the cumulative base of the first network device, an amount of data that the first network device previously requested to send, and an amount of data presently requested.

8. The method according to claim 6, wherein after synchronizing a cumulative base of the first network device and a cumulative base of the second network device, the request information comprises a third sequence number that is a sum of the cumulative base of the first network device, an amount of data that the first network device has previously requested to send, and an amount presently requested.

9. A data transmission method comprising:
receiving, by a second network device, request information describing an amount of data a first network device requests to send to the second network device;
determining, by the second network device, a first credit limit that is an amount of data allowed to be sent by the first network device in a packet-distributed load sharing manner;
determining, by the second network device, a first sequence number based on the first credit limit and either remaining space in an ordering cache of the second network device and the requested amount of data or a cumulative base of the second network device, wherein the first sequence number indicates a sum of an amount of data second network device has previously authorized the first network device to send in the packet-distributed load sharing manner and an amount of data the second network device presently authorizes the first network device to send in the packet-distributed load sharing manner; and
determining, by the second network device, a second sequence number based on the cumulative base and a second credit limit that is an amount of data allowed to be sent by the first network device to a port of the second network device,
wherein the second credit limit is based on a bandwidth margin and the requested amount of data, and
wherein the second sequence number indicates a sum of an amount of data the second network device has previously authorized the first network device to send to a port of the second network device and an amount of data that the second network device presently authorizes the first network device to send to a port of the second network device;
sending, by the second network device, grant information to the first network device, wherein the grant information comprises the first sequence number and the second sequence number.

10. The method according to claim 9, wherein determining the first credit limit comprises:
determining, by the second network device, that the first credit limit is a first preset limit; or
determining, by the second network device, the first credit limit based on a remaining space in an ordering cache and the request information, wherein the ordering cache is configured to reorder out-of-order data.

11. The method according to claim 9, wherein determining the second credit limit comprises:
determining, by the second network device, that the second credit limit is a second preset limit; or
determining, by the second network device, the second credit limit based on a bandwidth margin and the request information.

12. The method according to claim 9, wherein the request information further comprises one or both of an enabling field indicating whether a packet switching function and a request-grant flow control function enabled on the first network device.

13. The method according to claim 9, wherein after synchronizing a cumulative base of the first network device and a cumulative base of the second network device, the request information comprises a third sequence number that is a sum of the cumulative base of the first network device, an amount of data that the first network device has previously requested to send and an amount of data presently requested.

14. A non-transitory computer-readable storage medium, comprising one or more instructions, wherein when the one or more instructions are executed by one or more processors, the one or more processors is caused to perform a data transmission method comprising:
sending request information to a network device, wherein the request information is used to request to send data;
receiving grant information sent by the network device, wherein the grant information comprises first and second sequence numbers;
in response to the first sequence number being greater than a largest first sequence number previously received, determining a first credit limit based on a difference between the first sequence number and the largest first sequence number,
wherein the first credit limit is an amount of data allowed to be sent in a packet-distributed load sharing manner;
in response to the second sequence number being greater than a largest second sequence number previously received, determining a second credit limit based on a difference between the second sequence number and the largest second sequence number,
wherein the second credit limit is an amount of data allowed to be sent to a port of the network device; and
sending data to the network device based on the first and second credit limits.

15. The non-transitory computer-readable storage medium according to claim 14, wherein sending data to the network device based on the first credit limit comprises:
within a preset time period, upon the first credit limit being less than or equal to a first threshold, switching from the packet-distributed load sharing manner to a per-flow load sharing manner, and sending data to the network device in the per-flow load sharing manner.

16. The non-transitory computer-readable storage medium according to claim 14, wherein sending the data to the network device based on the first credit limit and the second credit limit comprises:
sending data to the network device based on a lesser one between the first credit limit and the second credit limit; or
in response to the first credit limit being less than the second credit limit, and a difference between the first credit limit and the second credit limit being greater than a second threshold, switching from the packet-distributed load sharing manner to a per-flow load sharing manner, and sending data to the network device in the per-flow load sharing manner.

17. The non-transitory computer-readable storage medium according to claim 14, wherein after receiving the grant information sent by the network device, the method further comprises:
upon the first sequence number being greater than the largest first sequence number, updating the largest first sequence number to the first sequence number; and
upon the second sequence number being greater than the largest second sequence number, updating the largest second sequence number to the second sequence number.

18. The non-transitory computer-readable storage medium according to claim 14, wherein the request information further comprises one or both of an enabling field indicating whether a packet distribution function and a request-grant flow control function are/is enabled.

19. The non-transitory computer-readable storage medium according to claim 14, wherein the request information further indicates a requested amount of data to send.

20. The non-transitory computer-readable storage medium according to claim 19, wherein after synchronizing a cumulative base and a cumulative base of the network device, the request information comprises a third sequence number that is a sum of the cumulative base, an amount of data previously requested to send, and an amount presently requested.

* * * * *